US012348990B2

(12) United States Patent
Wang et al.

(10) Patent No.: US 12,348,990 B2
(45) Date of Patent: Jul. 1, 2025

(54) AUTOMATIC TROUBLESHOOTING SYSTEM FOR USER-LEVEL PERFORMANCE DEGRADATION IN CELLULAR SERVICES

(71) Applicants: AT&T Intellectual Property I, L.P., Atlanta, GA (US); The Regents of the University of California, Santa Cruz, CA (US)

(72) Inventors: Jia Wang, Basking Ridge, NJ (US); Amit Kumar Sheoran, Raritan, NJ (US); Xiaofeng Shi, Somerville, NJ (US); Chen Qian, Scotts Valley, CA (US); Matthew Osinski, Westfield, NJ (US)

(73) Assignees: AT&T Intellectual Property I, L.P., Atlanta, GA (US); The Regents of the University of California, Santa Cruz, CA (US)

( * ) Notice: Subject to any disclaimer, the term of this patent is extended or adjusted under 35 U.S.C. 154(b) by 466 days.

(21) Appl. No.: 17/957,915

(22) Filed: Sep. 30, 2022

(65) Prior Publication Data

US 2024/0121636 A1   Apr. 11, 2024

(51) Int. Cl.
*H04W 24/04* (2009.01)
*H04L 41/149* (2022.01)
*H04L 41/16* (2022.01)
*H04W 24/08* (2009.01)

(52) U.S. Cl.
CPC ........... *H04W 24/04* (2013.01); *H04L 41/149* (2022.05); *H04L 41/16* (2013.01); *H04W 24/08* (2013.01)

(58) Field of Classification Search
CPC ...... H04L 41/149; H04L 41/16; H04W 24/04; H04W 24/08
See application file for complete search history.

(56) References Cited

U.S. PATENT DOCUMENTS

| | | | | |
|---|---|---|---|---|
| 10,200,884 | B2* | 2/2019 | Tan | H04W 24/02 |
| 10,321,344 | B2* | 6/2019 | Barton | H04W 24/08 |
| 10,579,928 | B2* | 3/2020 | Wang | G06N 7/00 |
| 10,609,578 | B1* | 3/2020 | Deb | H04W 24/08 |
| 10,614,376 | B2* | 4/2020 | Gopalan | G06N 20/00 |
| 11,399,295 | B2 | 7/2022 | Osinski et al. | |
| 2014/0164256 | A1* | 6/2014 | Booij | H04M 3/5231 705/304 |

(Continued)

*Primary Examiner* — Kashif Siddiqui
(74) *Attorney, Agent, or Firm* — Guntin & Gust, PLC; Andrew Gust

(57) ABSTRACT

Aspects of the subject disclosure may include, for example, training a cell-level machine learning model to predict a likelihood of a cell site in a cellular network having service issues that impact customers of the cellular network, training a user equipment (UE) level machine learning model using output information from the cell-level machine learning model and historical information about UE-level performance metrics, receiving, from a customer associated with a UE device operating on the cellular network, information about a service degradation experienced by the customer on the UE device, providing the information about the service degradation to the UE-level machine learning model; and receiving, from the UE-level machine learning model, information identifying a source of the service degradation. Other embodiments are disclosed.

20 Claims, 21 Drawing Sheets

(56) References Cited

U.S. PATENT DOCUMENTS

| | | | |
|---|---|---|---|
| 2017/0215094 A1* | 7/2017 | Akoum | H04W 24/08 |
| 2021/0385646 A1* | 12/2021 | Liu | H04W 24/04 |
| 2024/0119365 A1* | 4/2024 | Khatibi | H04W 36/00837 |
| 2024/0171480 A1* | 5/2024 | Sheoran | H04L 41/5067 |

* cited by examiner

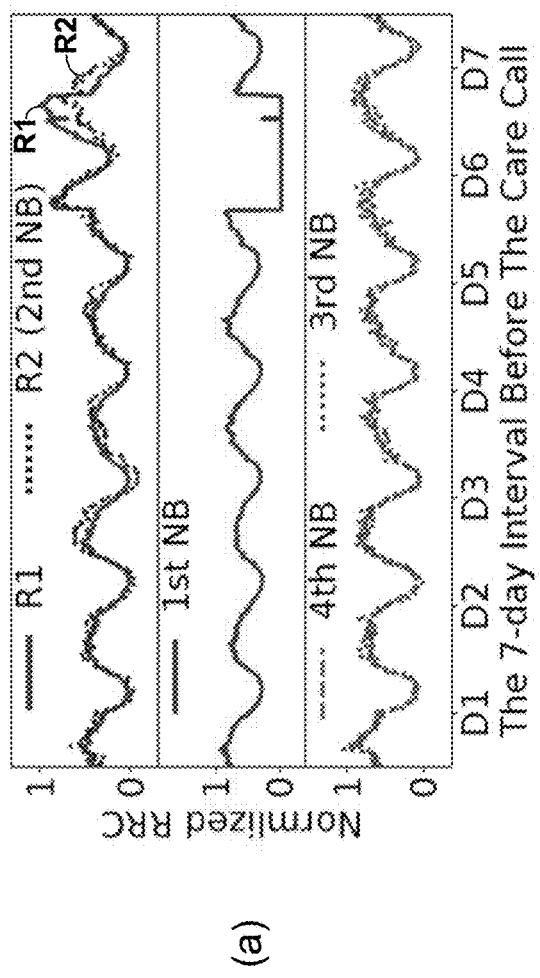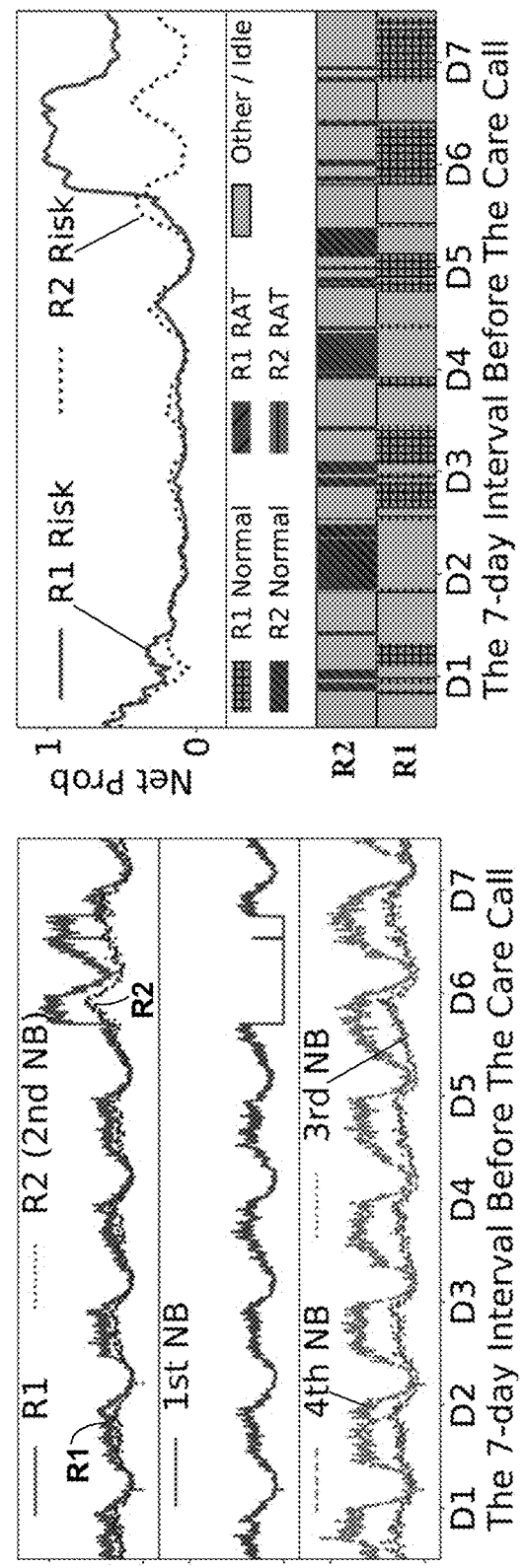
FIG. 2J

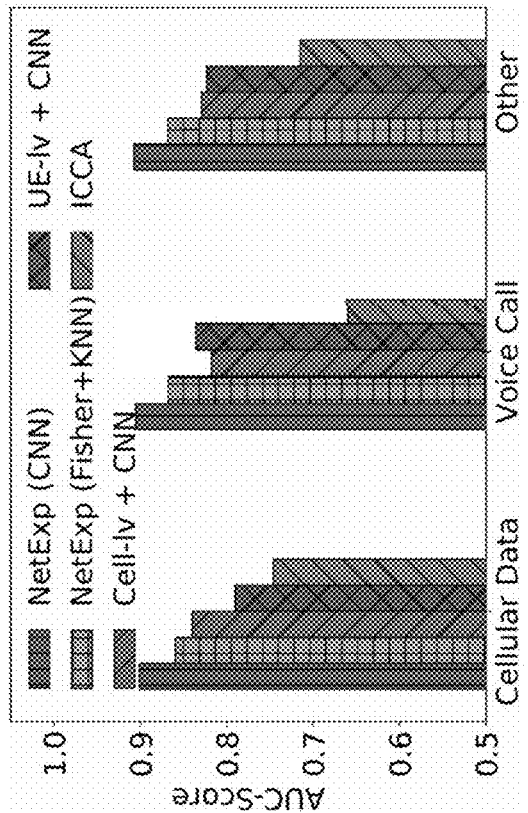
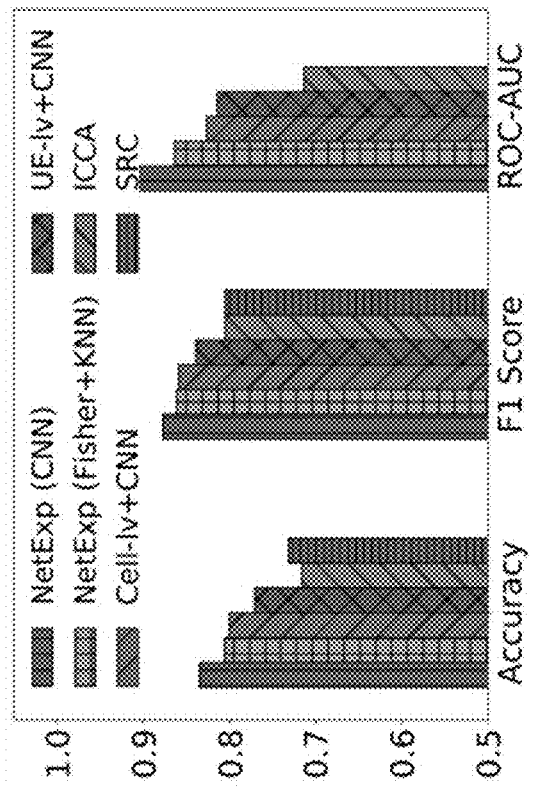
FIG. 2M

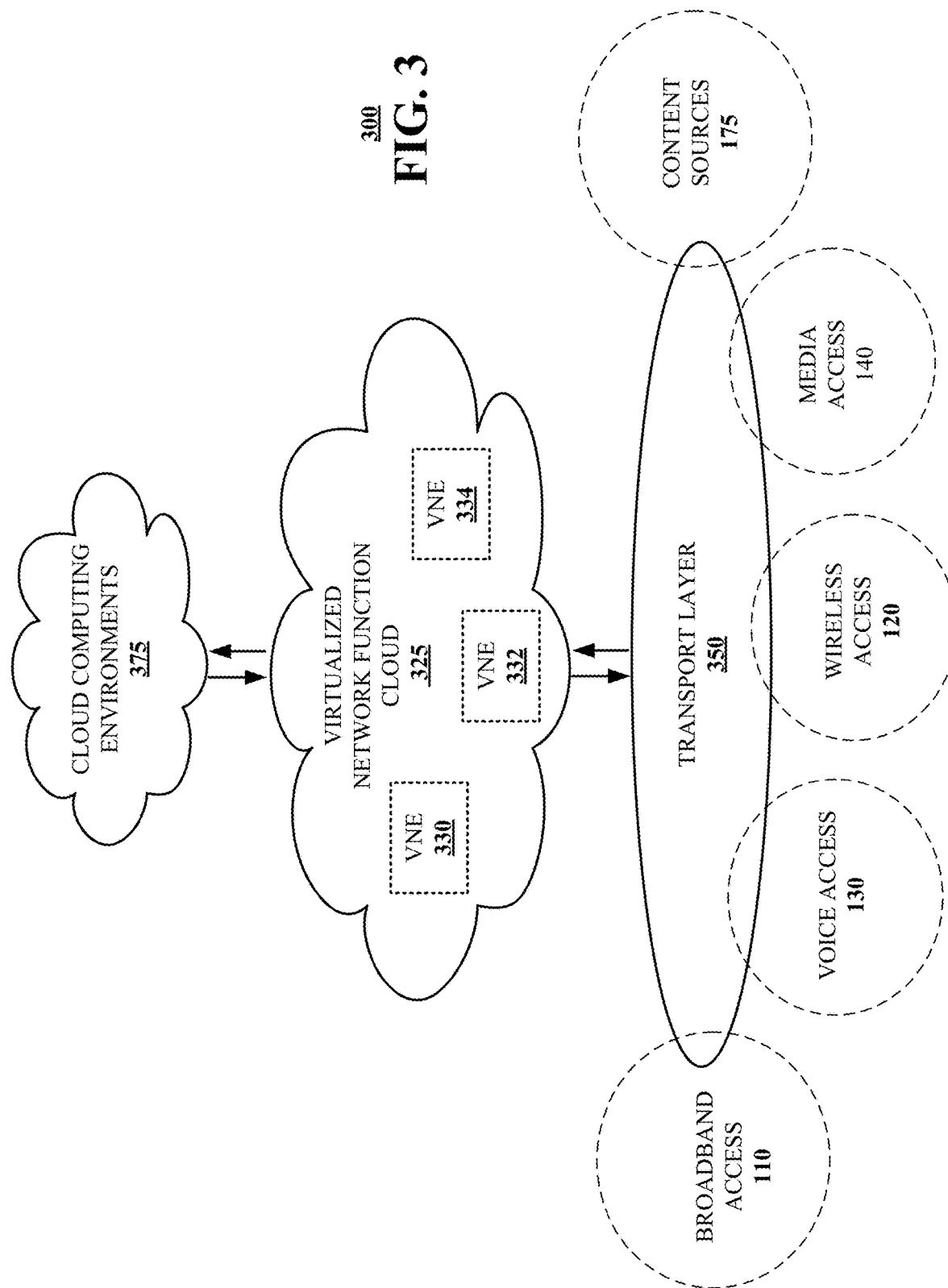

AUTOMATIC TROUBLESHOOTING SYSTEM FOR USER-LEVEL PERFORMANCE DEGRADATION IN CELLULAR SERVICES

FIELD OF THE DISCLOSURE

The subject disclosure relates to a troubleshooting system for user-level performance degradation in cellular services.

BACKGROUND

Troubleshooting cellular service issues at the per-User Equipment (UE) level is an essential task for cellular network providers. Service issues may arise from customers who are users of the cellular network cannot make voice telephone calls or experience slow data rates, for example. The customer may make contact a customer care service of the of the provider to troubleshoot the problem. However, diagnosing service issues at per-UE level may be costly because it requires advanced expertise and in-depth analysis of substantial amounts of network log data.

BRIEF DESCRIPTION OF THE DRAWINGS

Reference will now be made to the accompanying drawings, which are not necessarily drawn to scale, and wherein:

FIG. 2J depicts an illustrative embodiment of an evaluation dataset for evaluating performance of a troubleshooting system for a cellular network in accordance with various aspects described herein.

FIG. 2M illustrates evaluation results for the troubleshooting and resolution process for a cellular network in accordance with various aspects described herein.

FIG. 3 is a block diagram illustrating an example, non-limiting embodiment of a virtualized communication network in accordance with various aspects described herein.

DETAILED DESCRIPTION

Figure 1:
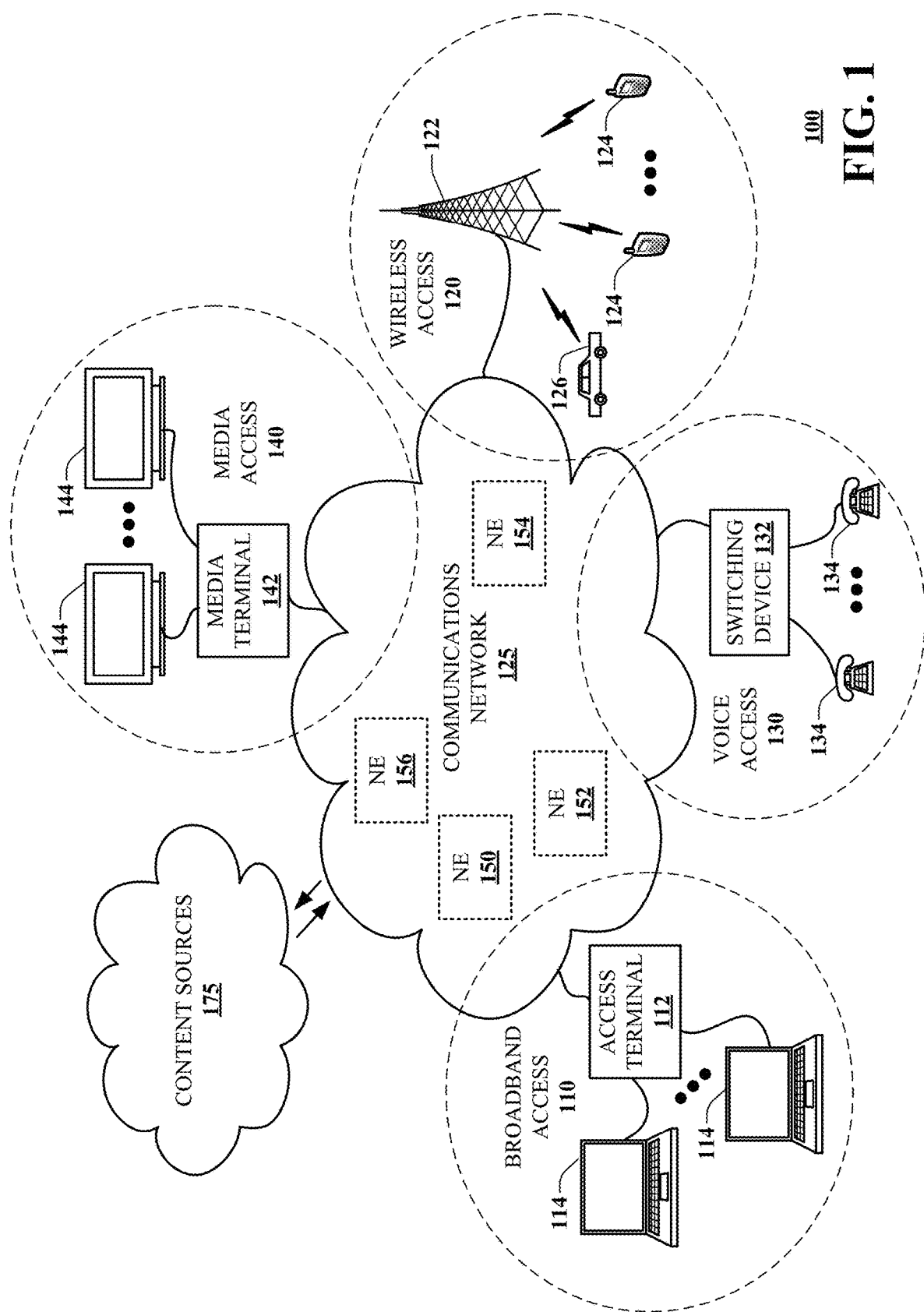
FIG. 1 is a block diagram illustrating an exemplary, non-limiting embodiment of a communications network in accordance with various aspects described herein.

The subject disclosure describes, among other things, illustrative embodiments for automatically identifying and resolving service issues in a cellular communication network or other mobility network. In embodiments, a generic and comprehensive data-driven approach enables automatically troubleshooting cellular service issues reported by customers. Embodiments determine whether the root cause of a user-reported service issue is from the network side or the device side through deep neural networks, which extract complex spatial-temporal feature profiles from large amounts of network log data. Other embodiments are described in the subject disclosure.

One or more aspects of the subject disclosure include receiving, from a customer, information about a service degradation at a user equipment (UE) device of the customer in a cellular network, receiving, from a cell-level network-state prediction model, a prediction about likelihood of network issues that impact customers in cell sites of the cellular network, and receiving information about current usage of the UE device. Aspects of the subject disclosure further includes identifying a source of the service degradation, wherein the identifying is based on the prediction about likelihood of network issues and the current usage of the UE device and modifying one of a network component of the cellular network and the UE device, based on the identifying the source of the service degradation to correct the service degradation.

One or more aspects of the subject disclosure include receiving cell-level training data including historical usage data for a plurality of cell sites of a cellular network, user mobility data for user equipment (UE) devices of the cellular network, performance metrics for one or more cell sites of the plurality of cell sites, and customer care contact data and trouble ticket data for previous reports of service degradation by customers in the cellular network, training a cell-level network-state prediction model using the cell-level training data. Aspects of the disclosure further include receiving, from a customer, information about a service degradation at a user equipment (UE) device of the customer in the cellular network. retrieving UE-level training data including performance metrics, data session logs for a data session by the UE device, training a UE-level troubleshooting inference model using the UE-level training data and output information of the cell-level network state prediction model, providing to the UE-level troubleshooting inference model the information about the service degradation at the UE device of the customer, and determining a likely source of the service degradation.

One or more aspects of the subject disclosure include training a cell-level machine learning model to predict a likelihood of a cell site in a cellular network having service issues that impact customers of the cellular network, training a user equipment (UE) level machine learning model using output information from the cell-level machine learning model and historical information about UE-level performance metrics, receiving, from a customer associated with a UE device operating on the cellular network, information about a service degradation experienced by the customer on the UE device, providing the information about the service degradation to the UE-level machine learning model; and receiving, from the UE-level machine learning model, information identifying a source of the service degradation.

Referring now to FIG. 1, a block diagram is shown illustrating an example, non-limiting embodiment of a system 100 in accordance with various aspects described herein. For example, system 100 can facilitate in whole or in part determine whether the root cause of a user-reported service issue in a communication network is from the network side or the device side through deep neural networks. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
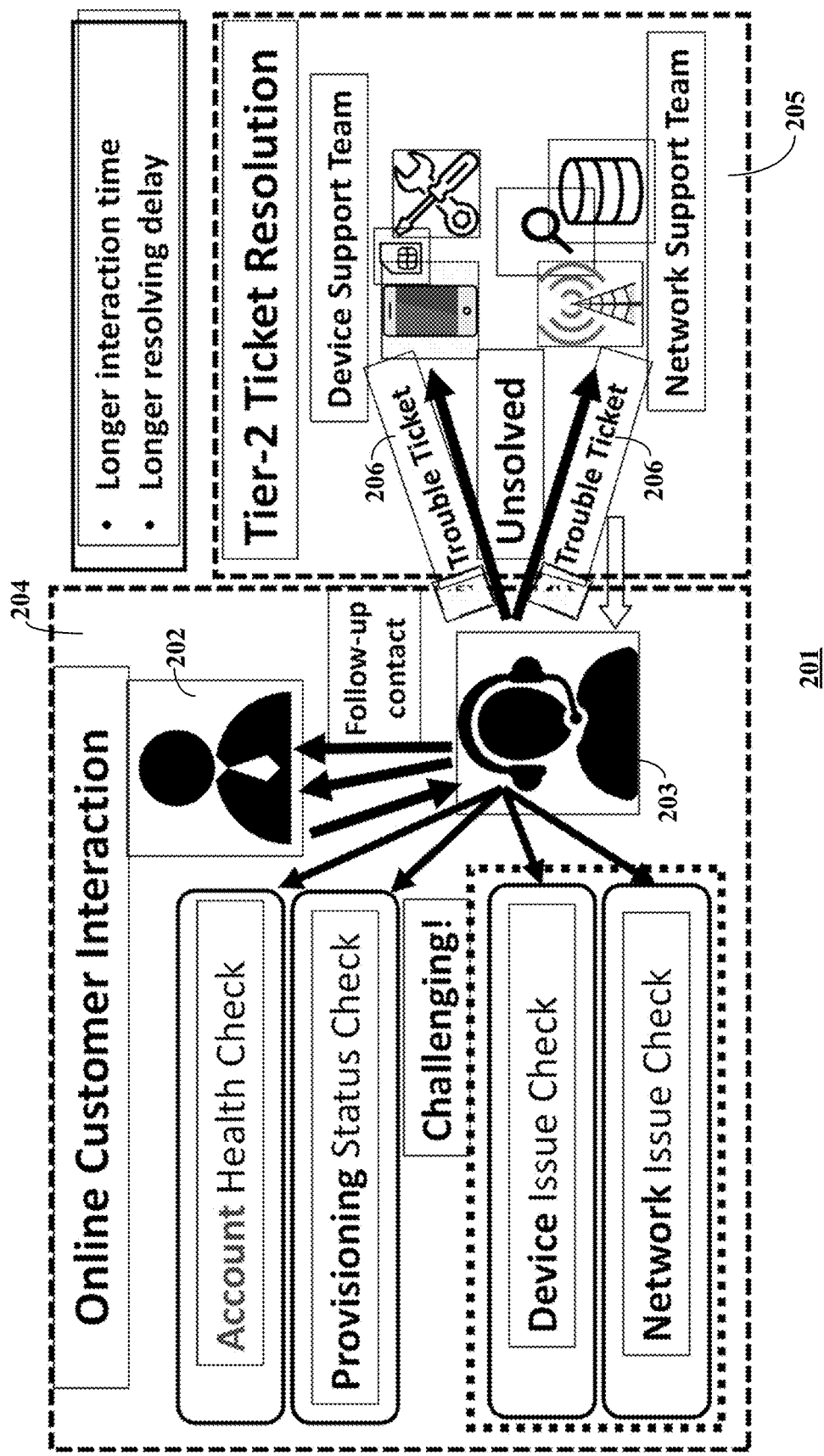
FIG. 2A is a block diagram illustrating an example, non-limiting embodiment of a prior art reactive troubleshooting and resolution process for a cellular network.

FIG. 2A is a block diagram illustrating an example, non-limiting embodiment of a prior art reactive troubleshooting and resolution process 200 for a cellular network. The reactive troubleshooting and resolution process 201 enables detection of network problems or issues with reliable network in a cellular network, mobility network or An essential task of cellular carriers or mobility network providers is providing reliable and high-performance cellular services or mobility services for end-device users. Such end-device users employ smartphones and other user equipment (UE devices) to access voice and data services of the mobility network. In order to guarantee reliability and improve users' experience, the carriers need to put substantial effort into resolving the service outages or performance degradation issues experienced by customers. In practice, the issues may be attributed to a variety of reasons. These reasons may include network outages or maintenance, provisioning errors, mobile phone hardware or software failures, and external events. Many automated functions have been deployed in current operating cellular networks to monitor the network status and proactively detect on-going or potential network failures such as outages or anomalies. Those systems can effectively detect major network issues that would affect a large population of users in the areas.

Despite the effectiveness of those proactive issue detection system, not all service issues experienced by the individual customers can be properly solved through proactive systems. There may still be many issues that are case-specific, such as problems from the specific user equipment, provisioning issues, and some isolated or minor network problems that substantially impact the quality of the specific user's experience. In addition, even if a network issue has been known by the provider, the provider also needs to respond to customers about those known issues and resolve customer concerns. As a complementary method, upon experiencing those cellular service degradation issues, one traditional way for customers to inquire about and resolve an issue is to actively contact the customer care services of the network provider and report the experienced issues. Then the service provider can respond accordingly regarding known network issues, or reactively investigate the root causes and help customers resolve the problems as timely as possible. The customer can make contact with the customer care service of the of the service provider to troubleshoot the problem. Generally, this conversation occurs over a phone call. The customer care service can utilize existing automatic troubleshooting systems to get some insight into the problem and get systems support. The customer care service can then help the customer to resolve the issue in order to reduce the handling delay and resolve as many issues as possible.

The customer-reported issues are typically resolved in two phases including a customer interaction phase and a ticket resolution phase. The customer interaction phase is a troubleshooting process where the customer engages directly with a care agent and receives diagnosis and resolution immediately over phone calls or online chats. However, not every customer-reported issue can be resolved in the customer interaction phase. More complicated issues that cannot be resolved during the customer interaction phase will then be sent to tier-2 support teams, such as a device support team and a network support team. The tier-2 support teams may be notified in the format of customer trouble tickets. In the ticket resolution phase, the ticket is routed to a tier-2 team based on the initial assessment of the possible root causes of the issue. It is possible that the initial assessment of the root cause of a ticket is not accurate, and the ticket can be routed through multiple teams before it is successfully resolved.

One key metric to measure the effectiveness of the customer care service is the resolution time for customer-reported issues. To reduce the resolution time, it is important to (i) minimize the time spent on inspecting the problem and identifying the root cause during the live conversation between the customers and the agents, (ii) minimize the number of customer tickets that need to be sent to tier-2 support teams, and (iii) minimize the number of tier-2 teams that a ticket is routed through before the ticket is resolved. Therefore, an automatic system that can timely and explicitly identify the root cause, such as whether the problem is from the network side or device side, of the user-reported issue, at an early stage of the troubleshooting process, can significantly help reduce the average end-to-end issue resolution time cost. For example, if the network operator can quickly determine that a reported issue is related to a known root cause, then there is no need to create a ticket for further investigation. If the network operator can determine a reported issue is not related to any known event and is likely to be network related, instead of device related, then the ticket will be routed directly to the network support team for resolution. These decisions need to be made at per user device level.

However, existing automatic cellular network troubleshooting methods cannot perfectly meet the above demand. Such methods are generally designed to detect network failures only at the cell-level. Namely, such methods mainly focus on detecting the network problems that potentially cause the emergence of service issues in an area, rather than responding to every individual customer's inquiry in a reactive manner during a live care contact. One key challenge for the latter cases is that the issues and the experience scenarios of every individual customer are highly diverse due to a large number of personalized factors of the customers and the areas. The convolution and correlation of these factors make the problem even more complicated.

In accordance with various aspects described herein, a data driven troubleshooting system and method enable identifying the root cause of user-reported issues in the online reactive troubleshooting phase. The system and method can automatically answer key questions in the customer interaction phase. That is, determining whether the root cause of a service issue reported by the customer is a network problem. To answer this question, the system and method also need to determine (1) whether there are any network anomalies that impacted the user in the corresponding serving cells, and (2) whether the user-side symptoms correlate with those network anomalies nearby. Designing and implementing such an automatic system is challenging because 1) jointly modeling the cell-level events and user equipment (UE) level events is difficult as it includes complex spatial and temporal context among cells-to-cells and cells-to-UEs; 2) there is no sufficient ground truth resolution data, which is expensive to obtain; 3) the unique features of the cells and the individual customers further complicate the problems. The system and method address the above challenges by utilizing and customizing advanced machine learning methods that are capable of modeling the complex cell-to-cell and cell-to-UE network state correlations.

FIG. 2A illustrates conceptually a conventional reactive troubleshooting and resolution process 201 implemented by a cellular network operator for resolving customer issues. Upon experiencing cellular service degradation, customers such as customer 202 may contact the customer care service (referred to as care or customer care) through an agent 203 of the service provider to report and resolve customer issues. The reactive troubleshooting and resolution process generally consists of two phases including a customer interaction phase 204 and a ticket resolution phase 205. An ideal customer interaction phase 204 requires identifying the root cause of the reported issue and provide proper resolutions or feedback to the customer within a short time, such as during a phone call having five to ten minutes' duration. The process of the customer interaction phase 204 happens in a reactive manner, namely responding to the customers' inquiries about the service issues they experienced.

A fundamental issue is to figure out whether the problem is caused by the issue occurs on the network side, such as RAN failures and core network issues, or on the user equipment (UE) or device side, such as device software errors. Another category of errors may include account problems, provisioning problems. For network issues, since the failures happen at the cellular infrastructure and cannot be resolved immediately during live customer care interaction, the care agent answering the call usually needs to share information about the existing issues with the customer and comfort the customer with backup plans or credit returns. If necessary, the care agent also needs to create maintenance tickets for issues and initiate the ticket resolution phase 205. On the other hand, if the root cause is an individual problem related with a specific end device or account, the care agent usually needs to provide help with the customer's device and account configurations and resolve the problem during the care contact. However, by investigating the care contact logs from a major cellular carrier in the US, it has been observed that it is still particularly challenging in the conventional workflow to find out the root cause of the service issue with just a short delay.

A summary of the process workflow is illustrated in FIG. 2A. During the customer interaction phase 204, the customer 202 actively speaks to an agent 203 associated with a customer care agent 203 through care calls or online chats. The agent 203 may go through a process including a sequence of designated troubleshooting steps to troubleshoot the service issue while the customer 202 is engaged in conversation. These troubleshooting steps involve checking customer account status, verifying provisioning status, examining device configuration settings and performing other device-specific diagnoses, and determining if the customer is impacted by any known events. For example, if the customer is attempting to use a network feature which is not included in the customer's subscription as recorded in customer account information, the agent 203 can report this this to the customer 202 and adjust the account as appropriate. Provisioning includes establishing all services which the customer is entitled to use on the network and may also be an easily discovered source of the customer's reported problem. Further, the agent 203 may have access to current information about network outages or limitations or known issues with a particular user equipment device like the customer owns. Discovering a device issue or a network issue are generally more difficult to accomplish and, as indicated in FIG. 2A, require a longer interaction time between the customer 202 and the agent 203 and may require a longer delay time to resolve.

While most service issues can be resolved in the customer interaction phase 204, some service issues may need in-depth investigation before a root cause can be identified. These remaining service issues can be either network-related or device-related. The agent 203 will create one or more customer trouble tickets 206 and dispatch them to the tier-2 support teams for offline inspection as part of the ticket resolution phase 205. During the customer ticket resolution phase 205, the inspection often requires gathering and analyzing measurement data over a time period at both the local network level and individual mobile device level. Depending on the complexity of the issues, the ticket resolution phase 205 may take hours to days to complete.

While some troubleshooting tasks (e.g., checking account and provisioning status) can be executed by software in an automated fashion, troubleshooting network-related or device-related issues is conventionally done manually due to the several challenges. First, troubleshooting a service issue at per-user equipment (UE) level is inherently complex. There are a variety of causes of service degradation, including different types of network issues and device issues, many of which produce similar symptoms. Such symptoms may include Internet connection failures, voice call drops, slow data rates, etc. Therefore, diagnosing based on the UE-side symptom itself may be insufficient to identify root causes. It is particularly challenging to discover the service issues caused by non-fatal or partial network-side or device-side issues. Some of these service issues can be intermittent or chronic. Therefore, precisely determining the root cause of each service issue often requires applying advanced domain knowledge in analyzing a massive volume of network data.

Figure 2B:
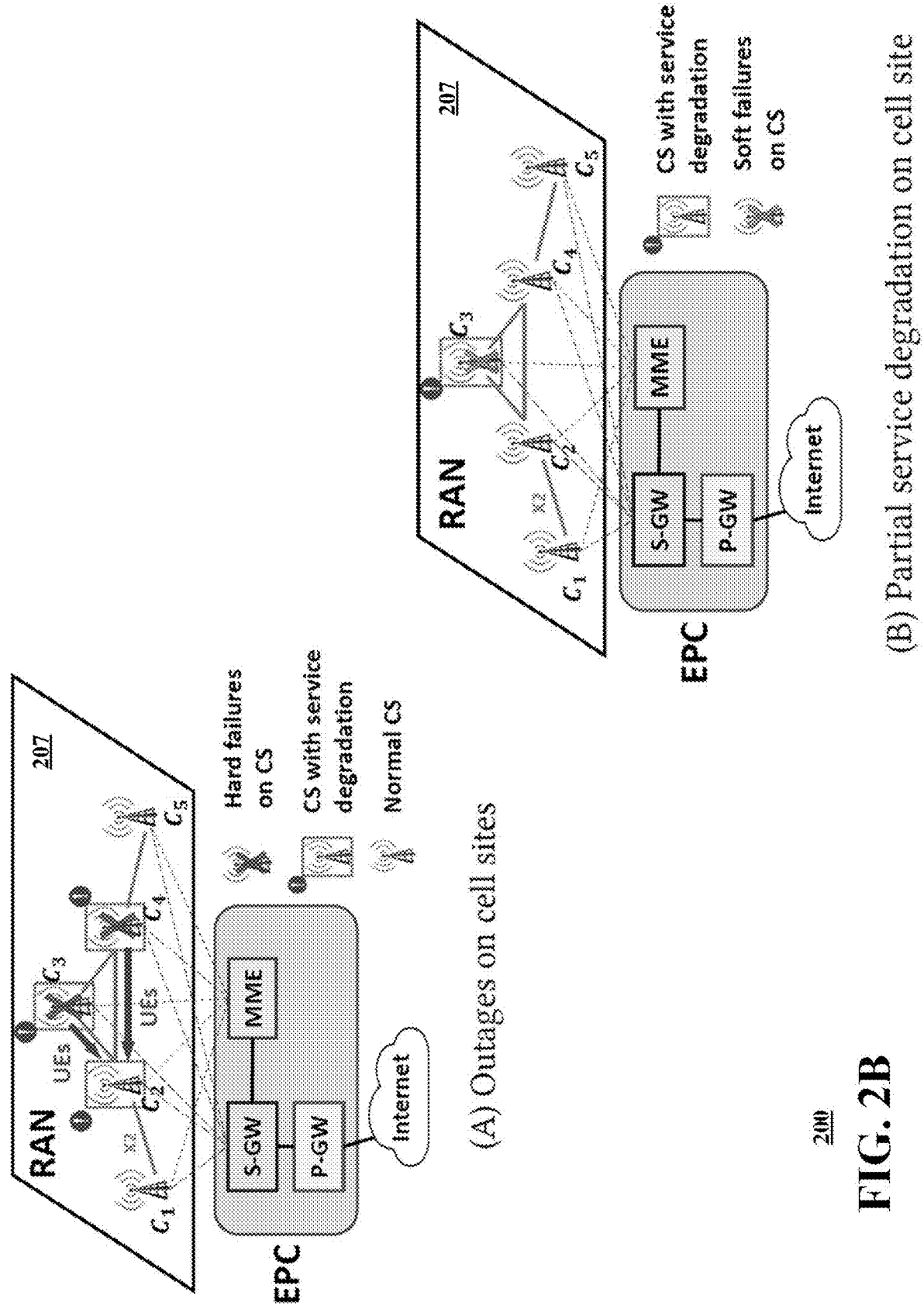
FIG. 2B illustrates exemplary network service problems in a cellular network.
Figure 2B:
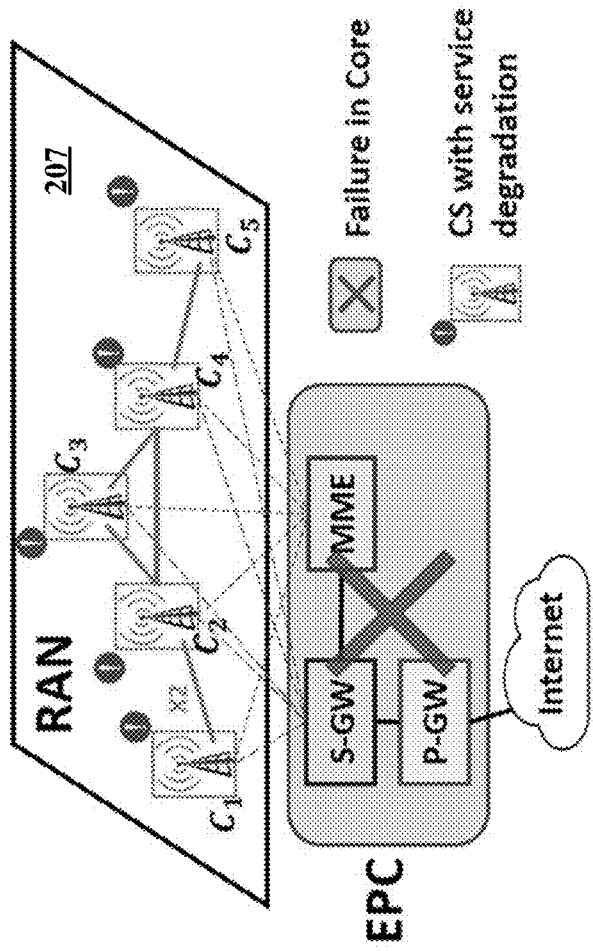

As a second reason troubleshooting network-related or device-related issues is conventionally done manually, it is not straightforward to discover some network problems on the cell level and estimate the scale of the impacted users and areas. FIG. 2B illustrates exemplary network service problem scenarios in a cellular network 207. In each instance, a radio access network (RAN) provides radio communication service between a group of cell sites (CS) labelled C1, C2 . . . , and mobile devices or UE devices in the RAN. Each cell site includes one or more evolved Node B devices or eNodeB or eNB in a fourth generation (4G) cellular network, or long-term evolution (LTE) network, or gNodeB or gNB in a fifth generation (5G) cellular network. The RAN is in data communication with and under control of a core network or evolved packet core EPC that includes a mobility management entity MME, a service gateway S-GW and a packet data network gateway P-GW. The mobility management entity authenticates and authorizes users on the RAN and responds to UE requests for network access. The S-GW serves a group of eNB devices and assists in setting up and tearing down a session for a particular UE device. The P-GW provides access from the core network to external packet data networks such as the public internet.

In the scenario illustrated in FIG. 2B(A), the cell site C3 experiences service degradation due to a radio access network (RAN) outage. The letter X across the symbol for the cell site (CS) indicates occurrence of a hard failure at that cell site. The box around the symbol for the cell site indicates the cell site experiences service degradation. Consequently, a large portion of UEs that were originally served by cell site C3 are handed over to its neighboring cell site C2 and cell site C4. This rerouting also causes congestion on cell site C2 and cell site C4 and impacts the experience of the customers in the areas served by cell site C2 and cell site C4.

In the scenario illustrated in FIG. 2B(B), a partial service degradation occurs at cell site C3. In the example, this is due to a soft failure at cell site C3. The service degradation in this example affects only UE devices attached to the cell site C3. Other adjacent cell sites and the core network EPC are only nominally affected.

In the scenario illustrated in FIG. 2B(C), a network issue occurs in the core network EPC, indicated by the X across the core network shown in the drawing figure. The network issue may influence the service performance in a wide area of the mobility network or cellular network 207. Thus, in the example, cell site C1, cell site C2, cell site C3, cell site C4 and cell site C5 are shown as experiencing service degradation. Users of UE devices served by these cell sites will experience anomalous or unreliable service. The examples in FIG. 2B(C) show that the impact of a network problem occurring in the core network EPC may not only influence the corresponding cells but also propagate to further cells.

From the perspective of responding to user complaints, the network operator may be challenged to correlate user tickets with some known network issues. In addition, since different network issues present diverse anomaly and propagation patterns, figuring out the impact of a network problem regarding the user-level quality of experience (QoE) may require a substantial understanding of the event patterns and their correlation among the neighboring cell sites.

Further, it can be difficult hard to utilize the massive amount of network data available. The data volume for network operations may be very large. The network data may have complex spatial and temporal correlations. This may include internal correlation among the data features and also the correlation between the data features and the customer care calls.

As a third reason troubleshooting network-related or device-related issues is conventionally done manually, ground truth data availability is limited. The ground truth data is generally from the existing troubleshooting system, but the number of the tickets that associate an issue with the real root cause is very limited for training a complex machine learning model. Only a small portion of customers report their service issues. Most customers never contact care support upon experiencing a service issue. Depending on the type and severity of service issues, some customers wait for a period of time before they contact customer care. The information provided by customers regarding their service issues can be ambiguous or inaccurate. Due to the high variance of users' behaviors, many issues need extensive investigation efforts.

Figure 2C:
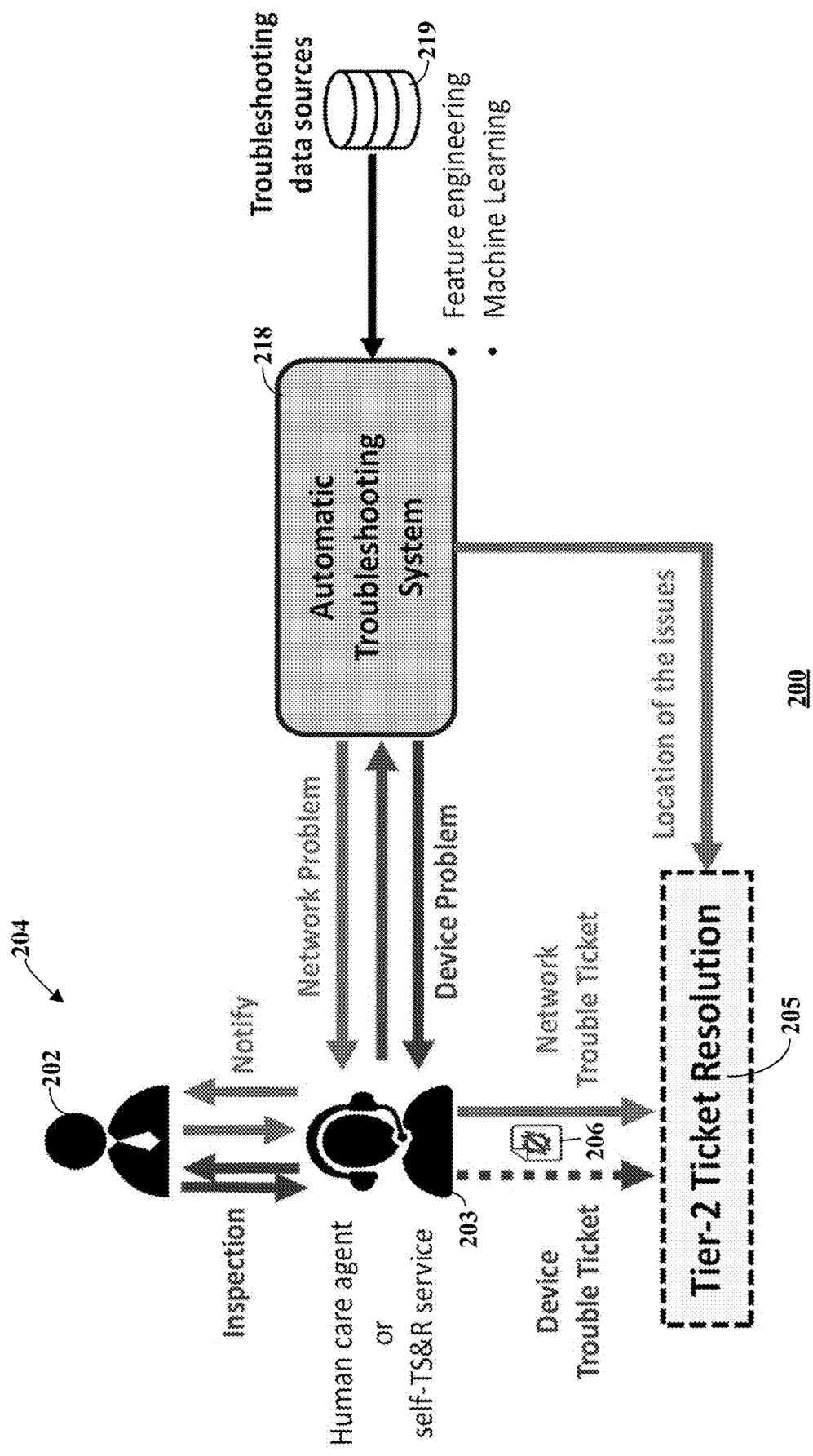
FIG. 2C is a block diagram illustrating an example, non-limiting embodiment of an automatic troubleshooting and resolution process for a cellular network.

FIG. 2C is a block diagram illustrating an example, non-limiting embodiment of an automatic troubleshooting and resolution process 200 for a cellular network. The automatic troubleshooting and resolution process 200 facilitates a troubleshooting process when a customer 202 contacts a human care agent 203 or when the customer 202 interacts with an automatic, interactive self-troubleshooting and repair service. The automatic troubleshooting and resolution process 200 facilitates a determination of a source of a reported problem, either the customer's device or the network.

In embodiments, the troubleshooting and resolution process 200 starts from retrieving the network logs on both the cell-site level and the user equipment level and creating a comprehensive feature profile for each customer who contacts the care service. The troubleshooting and resolution process 200 further uses a learning-based troubleshooting model that can automatically and efficiently find the root cause of the service problems by learning from the customer profile features. The system can be applied for reactive troubleshooting in the real-time care contact framework. The troubleshooting and resolution process 200 answers the following two questions. First, is there a UE-impacting network problem that is associated with a particular serving cell. Second, what is the root cause, a network problem or a device problem, for a particular service issue reported by a customer?

In the automatic troubleshooting and resolution process 200, the human care agent 203 can interact with an automatic troubleshooting system 218. The automatic troubleshooting system 218 is based on machine learning and rich data sources 219. The data sources 219 include historical data about network operation as well as current data about network status and operation. In embodiments, the automatic troubleshooting system 218 implements a learning-based troubleshooting framework and relies on one or more machine learning models to determine a probability that the source of the problem is in the user's UE device or that the problem is in the network.

In an example embodiment, the customer interaction phase 204 proceeds with the customer 202 interacting with the agent 203. The customer 202 reports symptoms and problems that the customer 202 has experienced in communicating between the customer's UE device and the mobility network. The agent 203 assists the customer 202 in identifying and resolving the problem. In some embodiments, the customer 202 may interact with an automated self-troubleshooting and resolution service. For example, the customer 202 may be given automatic voice prompts or text-based prompts and may provide suitable information in response. If the source of the problem is the account of the customer 202 or provisioning of service for the customer 202, the agent 203 generally can promptly resolve the problem for the customer.

If the source of the problem is not the account or provisioning, the agent 203 may interact with the automatic troubleshooting system 218. For example, the agent 203 may provide information to the automatic troubleshooting system 218 about the symptoms and issues reported by the customer 202. Further, information about the customer's identification, account, provisioning, UE device and network activities may be automatically forwarded to the automatic troubleshooting system 218. Generally, the agent 203 begins interacting with the automatic troubleshooting system 218 if the agent 203 cannot identify and resolve an account or provisioning problem for the customer. In some embodiments, the automatic troubleshooting system 218 silently monitors the interaction between the customer 202 and the agent 203 during the customer interaction phase 204 and may proactively provide information about the location of the issue to the agent 203.

The automatic troubleshooting system 218 responds to input information about the customer and the problem by identifying a likely source of the problem. In the example, the automatic troubleshooting system 218 returns to the agent 203 an indication that the source of the customer's problem is likely in the customer's device or that the source of the problem is likely in the network. This resolution is based on application of the input information to one or more machine learning models. The one or more machine learning models may be built and maintained using troubleshooting data sources 219.

The agent 203 receives the information about the likely source of the problem and generates a trouble ticket 206. In the ticket resolution phase 205, a network support team or a device support team responds to the trouble ticket 206. The information about the likely source of the problem is also provided to the network support team or the device support team to assist in resolution of the problem.

In operation, then the automatic troubleshooting and resolution process 200 including the automatic troubleshooting system 218 operates reduce interaction time between the customer 202 and the agent 203 and reduce the time for resolving the problem identified by the customer 202. Further, the automatic troubleshooting and resolution process 200 operates to reduce manual investigation efforts required of network provider personnel including the agent 203, a device support team and a network support team. The automatic troubleshooting and resolution process 200 enables the agent 203 and the network provider in general to properly respond to the customer 202, leaving the customer more likely to be satisfied that the customer's issue is being resolved. Further, the automatic troubleshooting and resolution process 200 increases the probability of submitting correct troubleshooting tickets to either the device support team or the network team but identifying the source of a problem in either the customer's device or the network.

Thus, to resolve the troubleshooting problem, a generic and comprehensive data-driven framework may be employed based on advanced machine learning models. The automatic troubleshooting and resolution process 200 has access to a wide variety of performance data from the network and user devices. This performance data includes cell-level data, including KPI information measured over time for each cell site. The cell-level data describes performance of the cell sites in the user's area. This performance data includes UE-level data including cellular session logs for each UE device active on the network. This provides historical information about the UE device of each particular user and how the user's UE device is performing.

Further, the performance data includes data that may be used for training a machine learning (ML) model. The training data is ground truth data or the data that may be used for training the ML model in supervised learning. This ground truth data includes care log data including records of care contacts between customers such as customer 202 and a customer care operation including agent 203. The care log data in embodiments may include user identification information which may be useful to map to available feature data. Also, the care log data provides insight to the network nodes provided as input by the care agent 203. The care log data may also include online data which provides the primary diagnosis for a customer issue such as whether the issue originates on network side or elsewhere. The care log data is based on human experience and human knowledge and the existing troubleshooting flow (FIG. 2A) without use of machine learning models. This performance data includes ticket data with offline troubleshooting results. The ticket data includes a subset of care contact information that has been received for issues that cannot be resolved by the agent 203 but require the agent 203 to issue a trouble ticket 206. The ticket data includes the results of a more in-depth investigation of an issue and an accurate resolution result for hard cases.

Specifically, network logs may be retrieved on both the cell-site level and the user equipment level, and a comprehensive feature profile may be created for each customer who contacts the care service. Then a learning-based troubleshooting model is created that can automatically and efficiently find the root cause of the service problems by learning from the customer profile features. The system and method can be applied for reactive troubleshooting in the real-time care contact framework. The system and method answer the following two questions: 1) is there a UE-impacting network problem that is associated with a particular serving cell; 2) what is the root cause, a network problem or a device problem, for a particular service issue reported by a customer.

The system and method in accordance with some aspects described herein incorporate a learning-based troubleshooting tool that aims at helping customer care agents distinguish if a customer reported service issue is caused by a network problem in the customer interaction stage, and helping tier-2 support teams to identify the possible cell sites that contribute to the service degradation in the ticket resolution stage. Thus, the system and method can significantly reduce the manual investigation involved in the troubleshooting process and hence reduce the overall resolution time.

In embodiments, several troubleshooting data sources 219 may be used or generated during the troubleshooting phases of the framework described herein. First, a Care Contact Log may be used. The Care Contact Log includes logs for the interaction phase. These include, for example, the time and date of the customer interaction, information about an issue type, information about resolution of the problem, etc. Second, trouble tickets may be used. Trouble tickets are conventionally handled by the tier-2 team and include information about expert resolution of hard cases. Third, cell-level network logs are used. This may include real time information about key performance indicators of the cell sites. This information may be connected at eNB or gNB devices. Fourth, UE-level network logs may be used. This includes information about a cellular session log for each UE device active in the mobility network 207. In examples, the UE-level network logs include user identification information, which may be anonymized, time and date information, duration of a session, information about accessed cell sites and information about a session status.

Thus, the data mainly includes historical customer care contact log and ticket details, and cell-level and UE-level network statuses such as cell site Key Performance Indicators (KPIs) and user session states. The cell-level KPIs that may be used include, for example, the average number of Radio Resource Control (RRC) connections, which reflects the temporary user population, and the average utilization ratio of the Control Channel Elements, which reflects the congestion status. Any other available or suitable KPI information or UE or network data may further be used to supplement the method and system. A data-driven automatic troubleshooting system and method are designed by learning from the above data. All datasets may be kept anonymous when being used for privacy reasons.

Figure 2D:
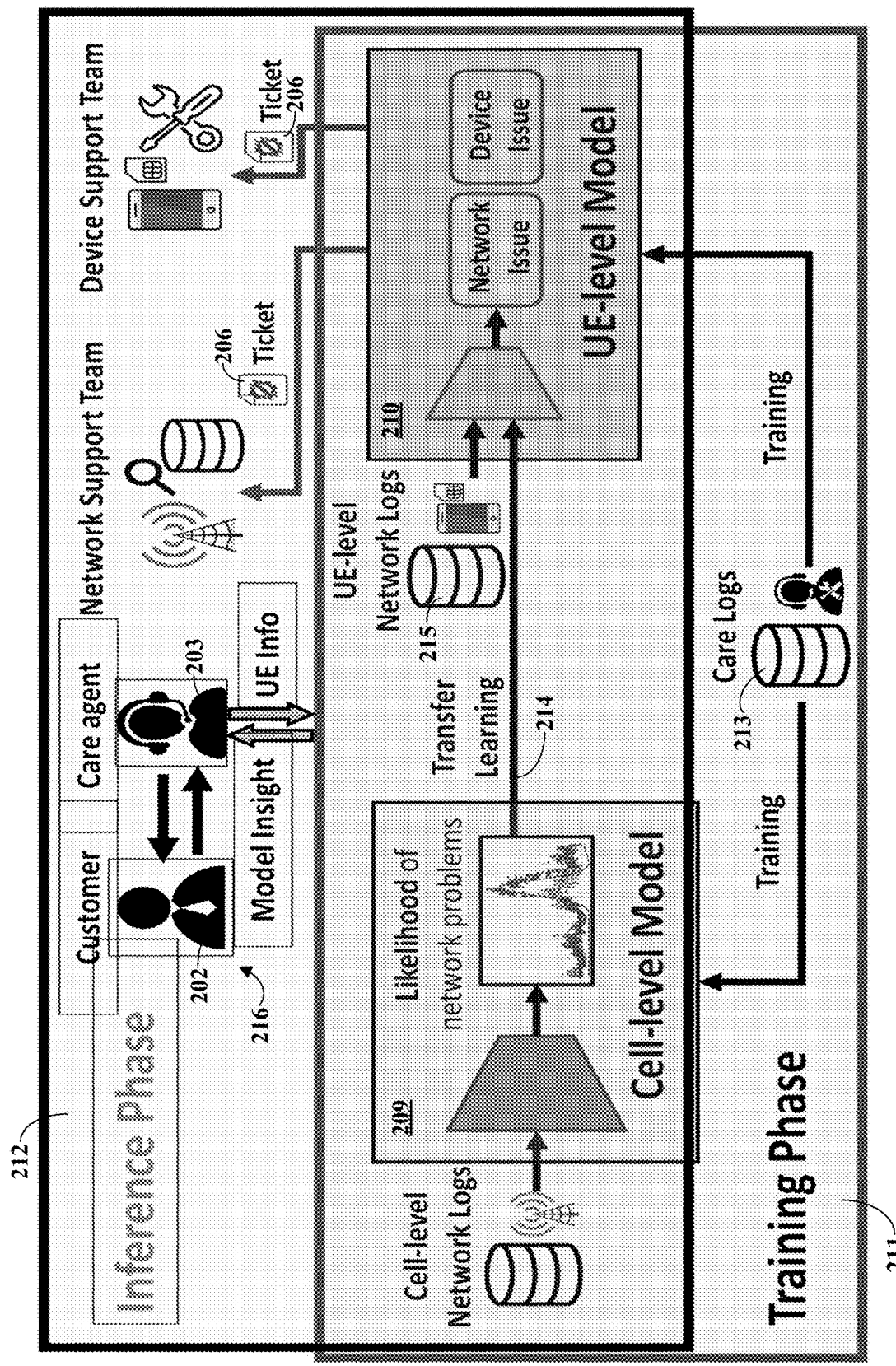
FIG. 2D depicts an illustrative embodiment of a troubleshooting system for a cellular network in accordance with various aspects described herein.

FIG. 2D depicts an illustrative embodiment of a troubleshooting system 208 for a network such as a cellular network in accordance with various aspects described herein. The troubleshooting system 208 forms a learning-based troubleshooting framework. The troubleshooting system 208 includes two major modules: (i) a proactive cell-level network state prediction model, cell-level model 209, and (ii) a reactive UE-level troubleshooting inference model, UE-level model 210. The proactive cell site level model, cell-level model 209, predicts the likelihood of a cell site to have network issues that impact customers in the covered cells. The UE-level model 210 infers whether a customer-reported service issue is network-related.

The goal of the troubleshooting system 208 is to distinguish whether the issue identified by a customer 202 originates from network side or from the device side. The customer 202 contacts the care agent 203 and the care agent 203 receives user information and provides that user information to the troubleshooting system 208. The user information includes information about the symptoms the user experiences. To distinguish the source of the customer issue, the UE-level model 210 learns from the symptoms reported by the user and from user-level network log information. The network operator wants to perform a user-level troubleshooting in response to a complaint from a user. Therefore the troubleshooting system 208 includes a classifier. Further, to determine whether the customer issue originates from the device or the network requires not just user-level log data but also network information. This may be provided by the cell-level model 209. The input to the cell-level model 209 is information from cell-level network logs. The goal of the cell-level model 209 model is to identify the anomalies in the network side which can cause the customer care issue.

The troubleshooting system 208 provides some weakly supervised learning in the form of transfer in a training phase. Generally, little or no ground truth data is available, meaning there is no correctly verified label for every care call. Therefore, the training phase 211 uses data that is both labelled and unlabeled for training the cell-level model 209. In the exemplary embodiment, the cell-level model is a very big neural network machine learning model, which can be hard to train.

As indicated in FIG. 2B(A) and FIG. 2B(B), events that happen in cell sites serving a neighborhood can correlate with each other. The correlation can vary based on the location of the network issue and the severity of the network issue. The level of correlation can be different, the troubleshooting system 208 needs to understand that based on the data using the machine learning models.

Operation includes a training phase 211 and an inference phase 212. During the training phase 211, the cell-level prediction model 209 is trained using historical usages, user mobility, performance metrics at the cell site level, and customer care contact and ticket data. This is illustrated generally as care logs 213 in FIG. 2D. The UE-level inference model 210 is trained using the output 214 of the cell-level prediction model 209, the historical UE level usages, user mobility, performance metrics, and the customer care contact and ticket data. This is illustrated generally as UE-level network logs 215 in FIG. 2D.

During the inference phase 212, the cell-level prediction model 209 proactively predicts the cell sites that are having customer impacting issues and quantifies the severity of the problem based on the real-time usages and cell site level performance metrics data. Upon receiving a customer contact 216 between a customer 202 and a care agent 203 reporting a service issue, the UE level inference model will take the cell site level prediction on current customer-impacting network issues in the related cells and current UE level usage, mobility, performance metrics to infer whether the customer reported service issues is caused by network related issues. The agent 203 can then dispatch a trouble ticket 206 to the correct support team, either the network support team or the device support team.

In contrast with a conventional solution illustrated for example in FIG. 2A, the cell-level model 209 fully considers the interaction among neighboring cell sites, and the UE-level model 210 provides a reactive network issue diagnosis method that is based on the perspectives from both the UE side and serving cell site side, and how the two-side states match each other. This will not only help customer care agents such as agent 203 to create a trouble ticket 206 and dispatch it to the corresponding support team for resolution, but also provide network support team enriched information to prioritize and focus on the right cell site for investigation and resolution.

With respect to feature modeling, learning the correlation and interaction between the neighboring cell sites is important for cellular data analysis. This learning is also challenging as it depends on many real-world factors, such as the local distribution of UE devices and cell sites, the mobility of the customers, geographic features, and carrier types. To solve this challenge, a graph model is used to represent the interaction between cell sites. A graph convolutional neural network is used to jointly learn the cell site node features and their correlation.

Figure 2E:
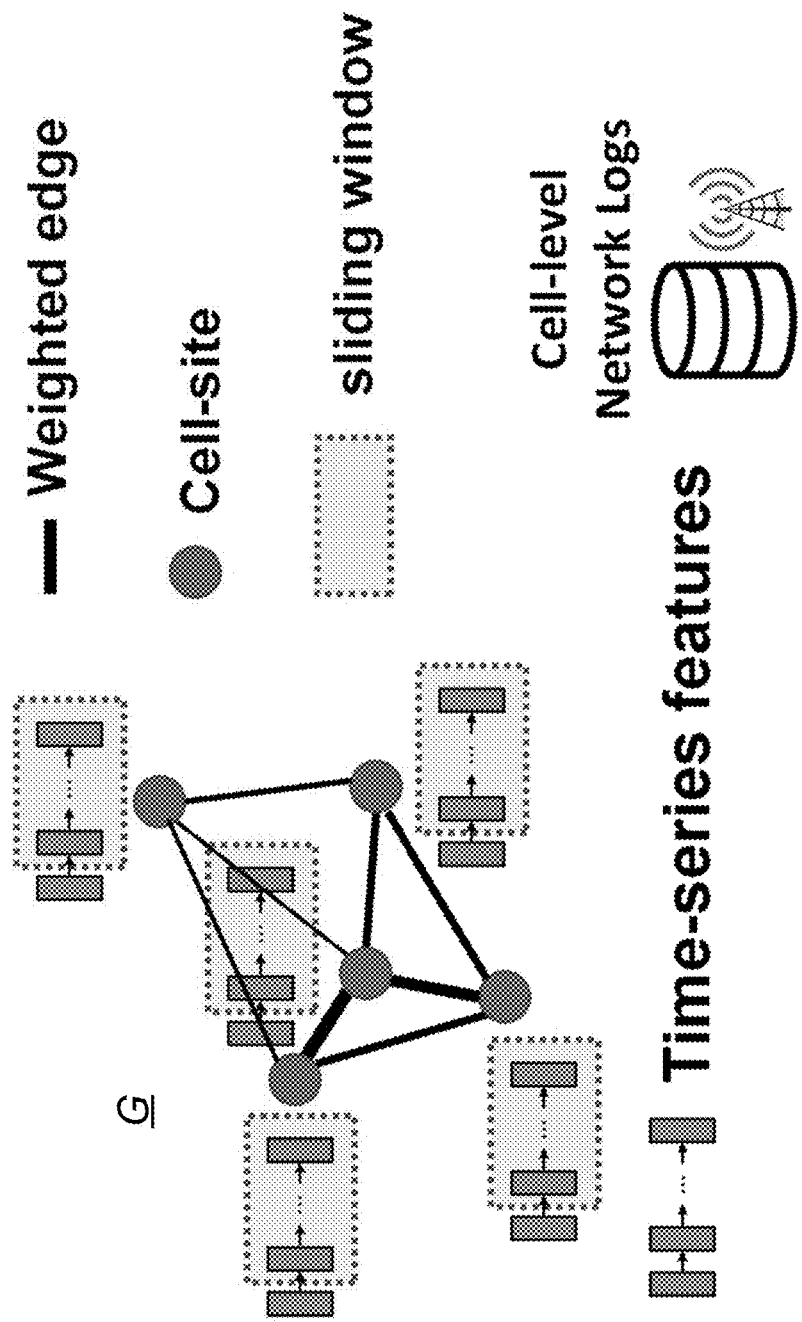
FIG. 2E depicts an illustrative embodiment of a graph model for use in a troubleshooting system for a cellular network in accordance with various aspects described herein.

FIG. 2E depicts an illustrative embodiment of a graph model 217 of cell correlations for use in a troubleshooting system for a cellular network in accordance with various aspects described herein. In the graph G, each node represents a cell site of k cell sites in the graph model 217 and each edge represents the proximity or weight between the two neighboring nodes or cell sites, including a first cell site and a second cell site. For each node or cell site, KPI data are available that describe the performance of the cell site as time-series data. A sliding window can be applied to the time-series data to extract the time series features for each cell site or node.

The proximity can be defined by two means. The first way is the number of commonly served users by the two cells in a unit of time. If there are relatively more commonly served users, the users are in the same vicinity and can either connect to either the first cell site or the second cell site, indicating that the two cell sites are very correlated. The second way is based on geographic distance. A distance threshold may be set to prune the graph model 217 to reduce the size of the graph model 217. For example, two cell sites that are more than the threshold distance apart, such as 30 km, are not considered correlated and are not both added to the graph model 217. This can reduce the amount of data processing and data storage required. Thus, the proximity can be defined in multiple ways and is discussed below in more detail. On each cell site vertex in the graph G, the network condition is represented with a time-series feature acquired by sliding a feature extraction window through the streaming cell-level network log data.

The graph model 217 forms a graph. To learn from the graph, the troubleshooting system 208 may use a graph neural network which is a machine learning model. The machine learning model takes the time series feature data of neighboring nodes and aggregates the information. The machine learning model provides an output corresponding to how likely the problem or issue will affect a user in the area.

Assume the pair-wise proximity among the k cell sites can be quantified by a two dimensional (2-D) adjacent matrix $A^{k \times k}$ (where each entry $a_{i,j}$ represents the proximity weight from node i to node j), let $G = <V^{k \times m \times w}, A^{k \times k}>$ represent the graph, where V is the k×m time series features of the k vertices (i.e., m feature channels for each node, and each channel has time-window length w). Through a graph convolutional network (GCN) layer, the feature on each cell site is recomputed by aggregating the features of itself and the other cell sites in the graph. For example, a typical GCN aggregation rule is defined in Equation (1) as:

$$H^{(l+1)} = \sigma((I_n - D^{-1/2} A D^{-1/2}) H^{(l)} W^{(l)}), \qquad (1)$$

where $H^{(l)}$ is the node-wise feature input to the layer l ($H^{(0)} = V$), $W^{(l)}$ is a trainable weight matrix that decides how the adjacency matrix $A^{k \times k}$ participates in the aggregation of the features, σ is a non-linear activation function, $I_k - D^{-1/2} A D^{-1/2}$ is the normalized graph Laplacian, $I_k$ is an identity matrix, D is the diagonal degree matrix with $D_{ii} = \Sigma_j A_{i,j}$.

In addition, the temporal feature (i.e., $H^{(l)}$) of the time-series network log data for the cell sites can be encoded by the one-dimensional convolutional neural network (1D-CNN) layers, as in Equation (2):

$$h_c^{(l+1)} = \sigma_t(h c^{(l)} \circ W_t^{(l)}), \qquad (2)$$

where $h_c^{(l)}$ is the time-series feature input of one cell site c in the graph ($h_c^{(0)}$ is the raw input feature), $W_t^{(l)}$ is the 1-D temporal CNN kernel, ∘ is the 1-D convolution operation, and $\sigma_t$ is the activation function. Through the two types of the convolution operations, the model is cable of extracting features with complicated spatial temporal context. The detailed deep neural network (DNN) architecture is explained below.

The system and method in accordance with embodiments herein may be required to identify root causes of the user-reported issues at the per-case level. It would be preferred to use the manual resolution result of each user's case as the end-to-end learning target. As noted, the network provider does not have enough ground truth data to train the cell-level model 209. Ground truth data would include information about care calls and a conclusion whether the issue behind the call was caused by the network or a user device. The network provider does have a set of data for care calls where the resolution is known, and the data have manual labels. The network provider further has a larger set of data for care calls where correct verified labels are not available. However, it is too costly to identify the whole population of the users impacted by the network issues in practice, including the majority who do not contact the care upon experiencing an issue. Manually selecting and labeling additional cases from the vast user population is also relatively expensive. Thus, only a limited number of ground truth troubleshooting results labeled and verified by expert human agents can be obtained. The lack of large-scale ground truth data makes it difficult to train a deep neural network (DNN) that learns from the high-dimensional data with tremendous spatial and temporal context.

To solve this challenge, ideas may be adopted from weakly-supervised learning and transfer learning. Specifically, in embodiments, the system and method may use an alternative learning target to pre-train the cell-level model 209, which may be considered the heavy part of the overall troubleshooting system 208. The cell-level model 209 addresses the probability that the cell is experiencing a UE-impacting network event at each timestamp t. Although the cell-level model 209 with the alternative target cannot directly answer whether a reported issue is a network-side issue, it is expected to provide the high-level representation of the network performance status for the related cell sites, which is an essential insight for case-specific troubleshooting according to experienced troubleshooting operators.

The following steps may be taken to build the transferred learning target. For each customer, the system and method retrieve the 7-day historical UE network log records before the care contact time and obtain a set of cell sites that are frequently accessed by the users. For example, data retrieved from the historical UE network log may indicated information identifying cell sites accessed by the UE device of a time period, such as seven days. A count may be maintained of numbers of times the UE device has accessed each cell site during the time period. Cell sites with the greatest number of accesses may be identified. Those cell sites are called the "reference" cell sites for this UE. Then, the system and method aggregate the total number of customer contacts within a unit time interval by each reference cell site. The aggregation results provide an idea of how many service issues are reported for each reference cell site in each unit time interval. Thus, the intensive gathering of service issues for a reference cell site usually implies network issues in the corresponding cells. Similarly, the system and method measure the aggregation numbers of the service issues that are diagnosed as network issues through the customer interaction phase 204 and the ticket resolution phase 205 using the ground truth troubleshooting tickets of the two phases, which provide extra dimensions about the scale of the influenced users in the area. In this way, the system and method associate the network status observations with the number of tickets received by the customer care services. Unlike conventional procedures that detect network anomalies based on the KPI values, this system and method are more focused on recognizing the events that impact the QoE of the end-users.

The learning target uses three vectors for each cell site c: $N_c(t)$, the number of total service issues over time; $R_c(t)$, the number of network issues identified during customer interaction; and $S_c(t)$, the number of network issues detected through ticket resolution. If a network issue happened on a cell site or on its neighbors, a significant increase of $N_c$, $R_c$ and $S_c$ can usually be observed shortly after the issue occurrence time.

Figure 2F:
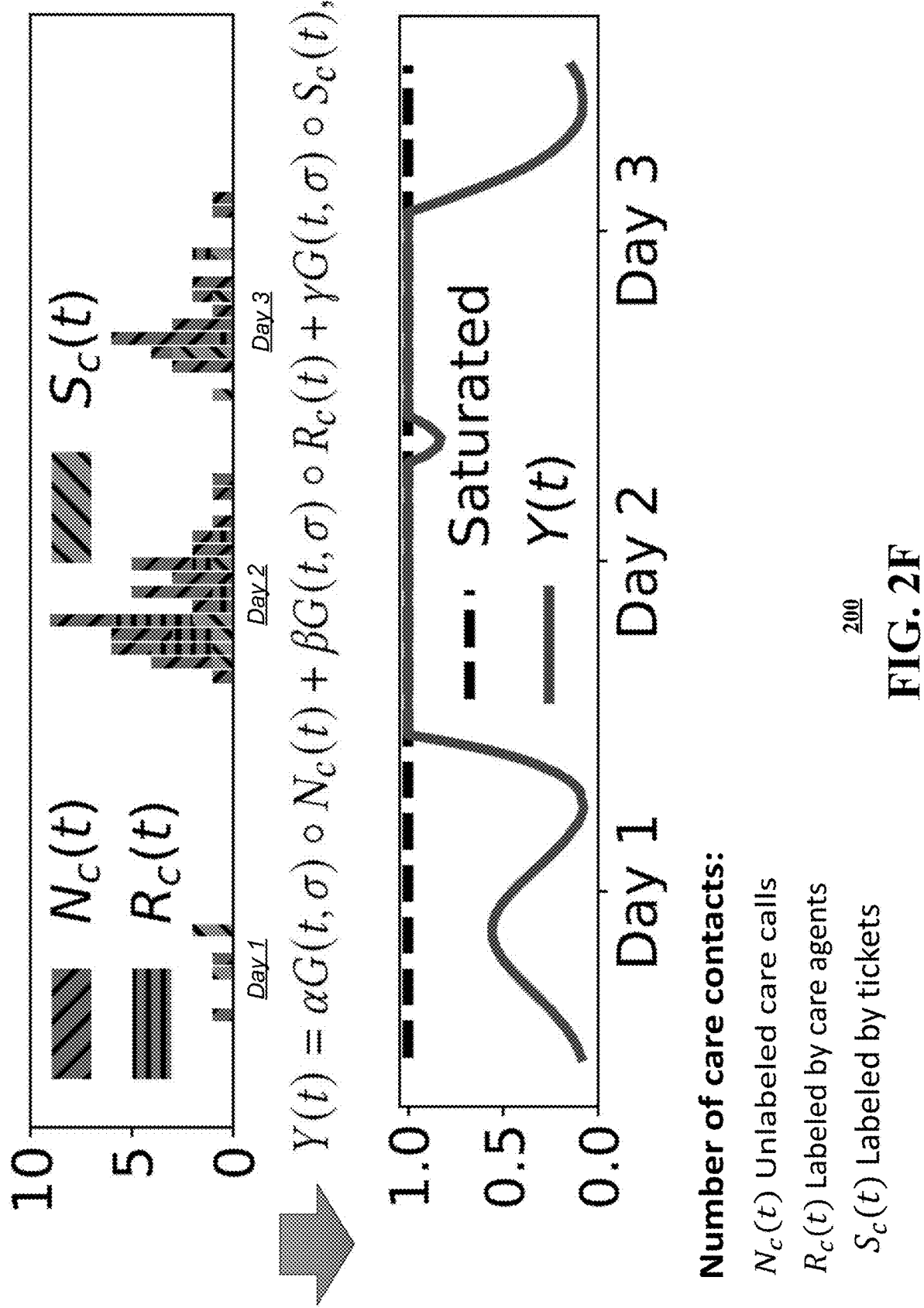
FIG. 2F depicts an illustrative embodiment showing distribution of service issues for a cellular network and a normalized transfer target for use in a troubleshooting system for a cellular network in accordance with various aspects described herein.

FIG. 2F depicts an illustrative embodiment showing, in the upper portion, a distribution of service issues from care contacts received over time for a cellular network. The lower portion of FIG. 2F shows a normalized transfer target for use in a troubleshooting system for a cellular network in accordance with various aspects described herein. The distribution of service issues is shown for three days, labelled Day 1, Day 2 and Day 3 in FIG. 2F. Distribution of $N_c$, $R_c$, and $S_c$ are illustrated by respective cross-hatching. Presence of more care contacts indicates there is an aggregation of issues in that area. $N_c$ indicates unlabeled care calls in a data set. $R_c$ indicates care calls in the dataset that have been labeled by an agent. And $S_c$ indicates care call that have been labeled by trouble tickets. This this observation may be translated into data which serves as the target of the learning model for the 209 cell level model. The data may be aggregated based on the density of the care calls over time to describe how likely the network issue in the area will impact the users in the neighborhood. This forms the artificial learning target which utilizes both the labeled data and unlabeled data in training the cell-level model 209.

An example of a significant increase of $N_c$, $R_c$ and $S_c$ is shown in the top chart of FIG. 2F (in Day 2 and Day 3 compared with Day 1). Based on this observation, the new learning target, i.e., the likelihood of network issues for the cell site c, can be quantified using $N_c$, $R_c$, and $S_c$. Specifically, we use the one-dimensional Gaussian Probability Density function $$G(t, \sigma) = \frac{1}{\sigma\sqrt{2\pi}} \exp\left(-\frac{t^2}{2\sigma^2}\right)$$

and compute the convolution of density kernel and the measurement vectors over the time dimension: $G(t, \sigma) \circ N_c(t)$, $G(t, \sigma) \circ R_c(t)$ and $G(t, \sigma) \circ S_c(t)$. Then the overall transferred learning target is defined in Equation (3) as a weighted sum of the three density vectors:

$$Y(t) = \alpha G(t,\sigma) \circ N_c(t) + \beta G(t,\sigma) \circ R_c(t) + \gamma G(t,\sigma) \circ S_c(t) \quad (3)$$

The overall transferred learning target Y(t) may be normalized and let Y(t) saturate at 1 to make the likelihood values in the range [0, 1] and resolve the population-dependent differences. An example of the normalized Y(t) is shown in the bottom chart of FIG. 2F. In the saturated areas of the lower portion of FIG. 2F, saturation indicates that, for that period of time, based on observation of the data, the system and method are pretty sure that in this area there exists a network problem that impacted a large number of users. Thus, if there is another user in the same area who called the care service and had a similar service issue, then it can be expected that the problem is a network side problem.

In the example, $\alpha$, $\beta$, and $\gamma$ may be decided empirically and should be adjusted based on the effectiveness of the practical troubleshooting phases ($N_c$, $R_c$, and $S_c$) in a practical system. Specifically, known network problems in the history may be reviewed to note the z-scores of $N_c$, $R_c$, and $S_c$ during the network issue periods. A larger z-score indicates the corresponding measurement is relatively more important. For example, for one studied cellular provider, use $\beta \geq \gamma > \alpha$ is used since the network issue tickets (from both online and offline phases) are more accurate network issue indicators than the total number of care calls.

Figures 2G, 2H:
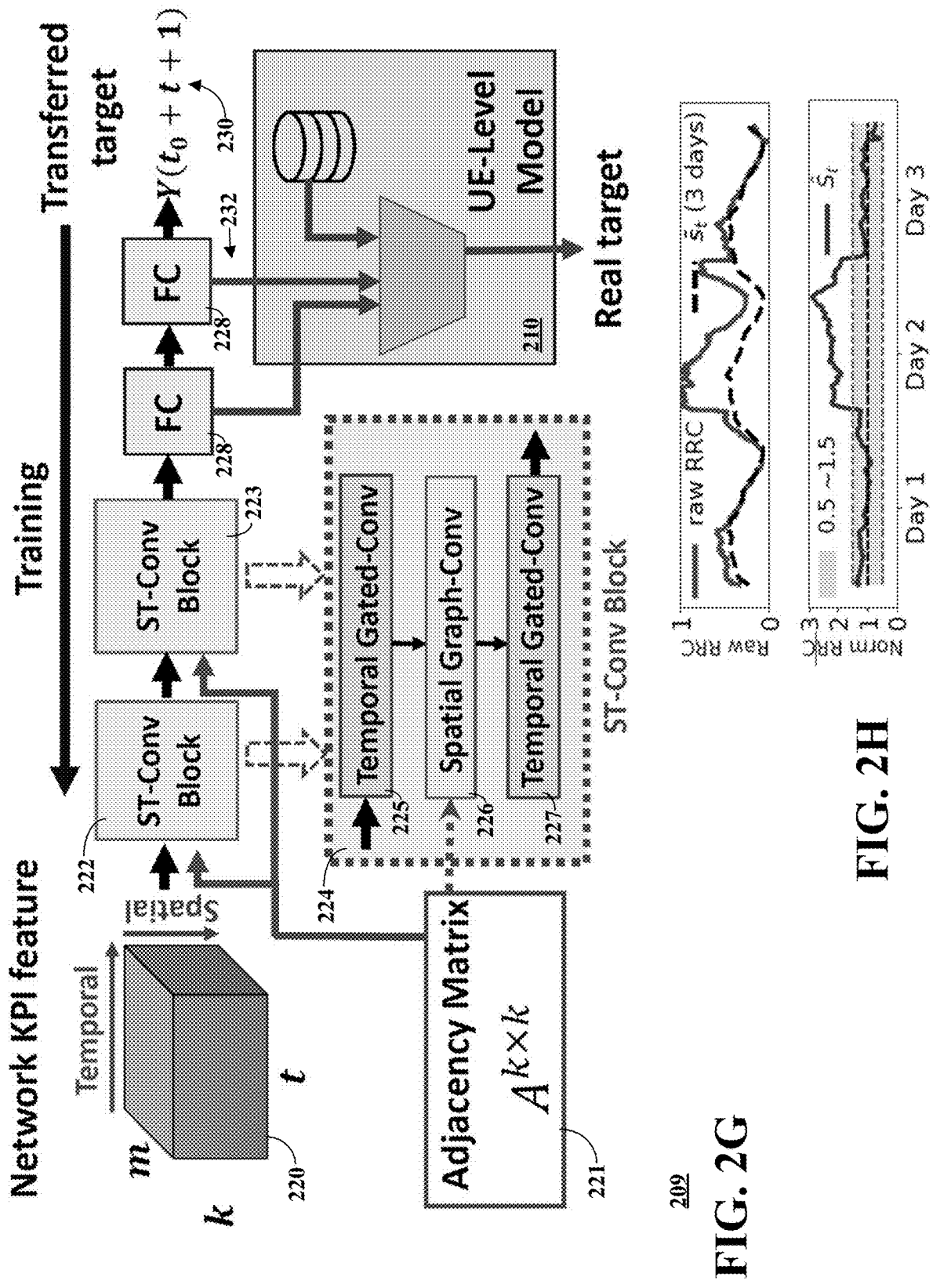
FIG. 2G depicts an illustrative embodiment of a cell-level model for a troubleshooting system for a cellular network in accordance with various aspects described herein.
FIG. 2H depicts raw and normalized average Radio Resource Control (RRC) connections for the same cell site in FIG. 2G in accordance with various aspects described herein.

FIG. 2G depicts an illustrative embodiment of a cell-level model 209 for a troubleshooting system 208 for a cellular network in accordance with various aspects described herein. FIG. 2G shows the overall design of the cell-level model 209 to encode the graph-based cell-level features. The neural network is inspired from the spatio-temporal graph convolutional neural network (STGCN) architecture. The whole cell-level model 209 is used as a feature extractor to learn the cell-level features for each local area. A local area refers to the cells covered by the cell under consideration and the k neighboring cell sites. The cell-level model 209 includes an input feature matrix 220, an adjacency matrix

221, a first spatial-temporal conversion block 222, a second spatial-temporal conversion block 223, and a fully connected network 228.

The input to the cell-level model 209 is an input feature matrix 220. The input feature matrix 220 in the embodiment has the form of a k×m×w cube. The dimension k represents the number of neighborhood cell sites being evaluated. This gives spatial information of the area. The dimension m corresponds to the number of channels of KPI data. Example KPI data include throughput in the network and the number of connected users. The dimension t is the size of the historical time window being evaluated. In the input feature matrix 220 of height k, the first m×w feature slice refers to the features of the cell site that directly carries the target UE. The remaining (k−1) slices are the features of its nearest neighbors ordered by the edge proximity. Once trained, the whole model parameters are consistent for different areas in a large market.

The adjacency matrix 221 in the exemplary embodiment is a k×k matrix, where k is the number of neighboring cell sites. The adjacency matrix 221 is a two-dimensional matrix that describes the proximity between each pair of the cell sites. The adjacency matrix 221 may be considered to describe how close are the two cell sites.

The output or result of the cell-level model 209 is the transferred target 230. The transferred target 230 indicates the likelihood of a network issue in the corresponding area. After training the cell-level model 209, the cell-level model 209 can be used to extract the features and use those features as the input to the next stage. That is the UE-level model 210. The cell-level model 209 gives the information that there is likely a network level problem creating the customer issue. But the final goal of the troubleshooting system 208 is to distinguish whether a customer who called into care has an issue which originates from the network side or from the device side. Therefore, another component, the UE-level model 210. The UE-level model 210 requires as an input the features learned by the cell-level model 209.

Figure 2I:
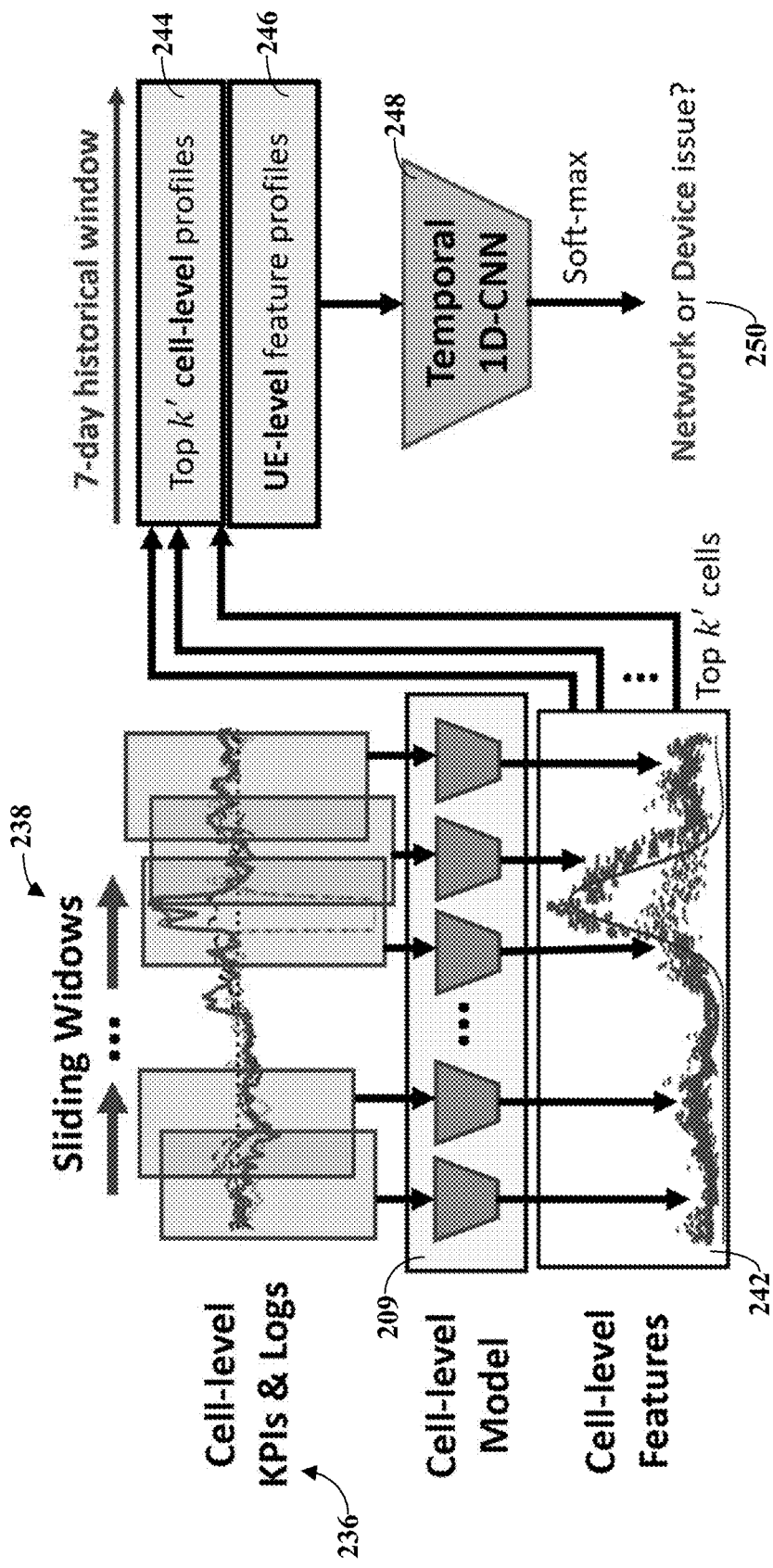
FIG. 2I depicts an illustrative embodiment of a user equipment-level (UE-level) model for a troubleshooting system for a cellular network in accordance with various aspects described herein.

In the input layer of the input feature matrix 220, m time-series network KPIs are used as the input features. For the real-number KPI values, the data may first be smoothed with moving average to denoise the data. Since the traffic loads and capabilities of the cell sites are highly diverse, the KPI data of the input feature matrix 220 is normalized before being fed for learning. One evident feature for the cell-level KPI data is that the pattern of the KPI time series repeats every 24 hours because of the similar daily traffic patterns. Therefore, we normalize the KPI data by:

$$\hat{s}_t = \frac{s_t}{\hat{s}_{tMODT}},$$

where $s_t$ is the observed KPI at timestamp t of the global clock, and $\hat{s}_i$ represents the expectation of the KPI of the ith timestamps of a day based on the historical data, T is the number of total timestamps in a day. Thus, the normalized KPI $\hat{s}_t$ represents that at a particular timestamp (t mod T) of the day, how the observed KPI compares with the expectation of the KPI for the same time of the day. This normalization method is effective for the KPIs that reflect or are related to traffic loads. For example, FIG. 2I1 shows the raw and expected Radio Resource Control (RRC) on the top portion and normalized average RRC connections over three days for the same cell site in FIG. 2F. The normalization method makes the abnormal network KPIs, in day 2, for example, highly distinguishable. The abnormal RRC KPI states in day 2 of FIG. 2H can well explain the increase of issue reports in day 2 and day 3 of FIG. 2F. Thus, this normalization method is an effective outlier detection module to highlight the abnormal KPI values for a given timestamp of the day.

The first spatial-temporal conversion block 222 and the second spatial-temporal conversion block 223 can encode the spatial-temporal features. Exemplary constituent elements of the first spatial-temporal conversion block 222 and the second spatial-temporal conversion block 223 are shown in phantom as ST-Conv Block 224 in FIG. 2G. Each of the first spatial-temporal conversion block 222 and the second spatial-temporal conversion block 223 in the exemplary embodiment includes a temporal gated convolutional network 225, a spatial graph convolutional network 226 and a temporal gated convolutional network 227 arranged in series. In each spatial-temporal conversion block 222, 223, the features of each cell site are provided to a one-dimensional (1-D) temporal convolutional neural network (CNN) layer (temporal gated convolutional network 225; Equation 2 above) with the gated linear units (GLU) as the activation. Then the processed features of all cell sites in the local graph are aggregated using a spatial graph convolutional network (GCN) layer (spatial graph convolutional network 226; Equation 1 above). The GCN block is then followed by another temporal CNN layer (temporal gated convolutional network 227) for each cell site of the graph to generate the feature representation of the network conditions $H_l^{k \times g \times w_l}$, where g is the number of kernels in the last 1-D CNN layer and $w_l$ is the resampled window size. After the two ST-Conv blocks 222, 223, the model flattens the feature matrix over the time channel and uses a fully connected network 228 (FC) layer with kernel size h to compute the (k×h)-D feature representation $H_{FC}^{k \times h}$ of the network conditions on the k cell sites for the sampled timestamp. Thus, $H_{FC}^{k \times h}$ can be used as the extracted feature for the network conditions of the local area at a given time.

In the output layer, the model uses a regression loss function to learn the target $Y^k$ of the k cell sites in the local area. The mean square-error (MSE) loss is used for training, Equation (4):

$$L(H_O^k(t), Y^k(t+1)) = \frac{1}{k}\sum_i \left(h_O^i(t) - y^i(t+1)\right)^2 + \lambda L_2, \qquad (4)$$

where $H_O^k(t)$ is the output of the model with the input time window that ends at time t, $Y^k(t+1)$ is the transferred learning ground truth, transferred target 230, of the sampled k cell sites at t+1, $h_O^i(t)$ and $y^i(t+1)$ are the ith entry of $H_O^k(t)$ and $Y^k$ (t+1), and $\lambda L_2$ is the L2 regularization term of the trainable parameters. The model may be trained with Adam optimizer, for example.

In the exemplary implementation, the four Temporal 1-D Gated-Conv layers temporal gated convolutional network 225 and temporal gated convolutional network 227 of the two ST-Conv Blocks 222, 223, have 32, 16, 8, 4 CNN kernels respectively. The size of each kernel is 4, namely, the perceptive field length of the first CNN layer is 20 minutes. The number of neurons h in the feature embedding layer is set as 8. Other values for kernel size and number of neurons may be used as well. Validation results show that larger model size provides limited accuracy improvement but more memory cost and overhead. In an example validation, the model is executed on CPU servers rather than GPU servers due to data access restrictions. The model should learn the network states in real-time for tens of thousands cell sites. Therefore, a larger model configuration is not preferred. The selection of the two key parameters of the input layer, i.e., k and w, is discussed below. After training using the transferred target 230, the system and method freezes the parameters of the model. Then the system and method provide output 232, the learned $H_{FC}^{k \times h}$ and $H_O^k$, to the UE-level model 210 as the high-level feature representation of the cell site performance status.

The UE-level model is the direct interface for the care agents to learn whether a reported problem is a network-side issue or a device-side issue. Besides the patterns of the UE network logs, another important feature is the temporal correlation of the UE level service errors and the cell-level anomaly states. Thus, the UE-level model may be designed such that it learns from the features in both aspects.

FIG. 2I depicts an illustrative embodiment of a user equipment-level (UE-level) model 210 for a troubleshooting system for a cellular network in accordance with various aspects described herein. The UE-level model 210 includes a cell-level log (CLL) feature and a UE-level feature. The CLL feature is a network side feature and receives cell-level KPI information and logs. The CLL feature applies one or more sliding window 238 to scan over historical period of the cell side KPIs that is relevant to the corresponding user. That enables extraction of a likelihood of network problems over time. The top k' cells that are most relevant to the user are retained and used to generate the feature profile of the of the network level. In addition, the UE-level model 210 has a UE-level feature. The UE-level feature is from the network session logs for the particular user device. That provides information such as times when the user cannot connect to cellular sessions or whether the session was terminated normally. This describes some symptoms that the user may experience. The UE-level model 210 further correlates the two features by the time channel in order to learn the temporal feature correlations between the CLL feature and the UE-level feature. Finally another machine learning model, CNN classifier 248, operates to decide whether this is a network problem or a device problem.

The UE-level model 210 receives cell-level KPIs and logs 236 and applies one or more sliding windows 238 to the received input data. UE-level feature profiles for learning can be created based on the historical data session logs of the cell-level KPIs and logs 236 for each individual UE device active in a cell. Specifically, for each customer who contacts customer care, the data session logs can be retrieved for the target UEs. In embodiments, the data session logs of the cell-level KPIs and logs 236 can include information about the time of day and duration of the session, the accessing cell sites, and the categorical session status. Then a session usage pattern feature matrix $U_d^{n \times w'}$ can be created for each UE d, where n represents the n-dimension one-hot encoding of the session status, and w' is the historical feature time window size of the sliding windows 238 for UE-level trouble inspection. In addition, based on the cell site that the data session is connected with, a detailed break-down of session usage features $B_d^{(k' \times n) \times w'}$ may be used for the top k' cell sites that are most frequently accessed by each device d. In an embodiment, k'=5. According to a measurement over a nationwide cellular network in 30 days, the top 5 cell sites contributed to 86% of the cellular sessions and 91% of the usage time on average for each customer. Thus, if a user suffers from a network problem, the cell sites that are responsible are most likely among these top 5 cell sites.

For effective troubleshooting, the system and method correlate the UE-level profile features with the network status of the top k' reference cell sites. To achieve this goal, the system and method creates a cell-level profile 244 for the reference cell sites by using the learned features from the cell-level model, namely, $H_{FC}^{k \times h}$ and $H_O^k$. For each UE, the system and method look back over a one-week historical time window and construct the corresponding feature profiles 244. One week or seven days is an exemplary time window size. However, any suitable window size may be used. The extracted UE-level and cell-level features are concatenated over the time dimension for temporal correlation learning, forming UE-level feature profiles 246. The feature engineering method of the UE-level model 210 is shown in FIG. 2I. In the left side of FIG. 2I, the system and method apply the pre-trained cell-level model 209 of FIG. 2G and uses a sliding window 238 to extract the cell-level profile features 242 over the one-week history. The stride of the sliding window is 1 hour in one example though any suitable value may be used.

The final decision-making model is a convolutional neural network (CNN) classifier 248. In an exemplary embodiment, the CNN classifier 248 contains several 1-D temporal CNN layers (Equation 2), followed by two fully connected layers with a softmax layer at the end. The softmax layer performs the softmax function which converts a vector of K real numbers into a probability distribution of K possible outcomes. The learning target is whether the problem associated with the UE is caused by a network-side issue or a device-side issue. The result of this decision forms the output 250 of the CNN classifier 248.

The UE level model 210 is trained as a binary classifier using the case-specific manual resolution results from the troubleshooting log data. Since the UE-level model 210 has a much smaller parameter size and only contains a few 1-D CNN layers in the CNN classifier, the UE-level model 210 is much easier to train than the cell-level model 209. Thus, the UE-level model 210 can be properly trained using the limited ticket resolution data.

The UE-level model is the direct interface for the care agents to learn whether a reported problem is a network-side issue or a device-side issue. A care agent may provide to the UE-level model information about a service degradation reported by a customer. The information may include identification for the UE device or UE devices. The information may include information about the nature of the service degradation. Upon receipt of the information about a service degradation, the automatic troubleshooting system 218 (FIG. 1) operates to determine a source of the service degradation. The automatic troubleshooting system 218 may report the information about the source of the service degradation to the care agent and the agent may take appropriate action. Appropriate action may include any suitable modification of a network component such as a cell site of the cellular network or the UE device of the customer. The modification may be based on identifying the source of the service degradation to correct the service degradation. The modification may be performed by the network support team, the device support team or the care agent.

For example, if the automatic troubleshooting system 218 concludes that the source of the service degradation is in the cellular network ("a network problem"), the care agent may initiate a network trouble ticket. The network trouble ticket includes information prompting a network support team to manually investigate the reported service degradation. Information collected by the care agent from the customer may assist that investigation. The network support team may take a variety of actions to address the service degradation. In an example, the network support team may dispatch a repair crew to one or more cell sites of the cellular network to identify and repair failing equipment and correct the service degradation. In another example, the network support team may activate communications with equipment at one or more cell sites to reconfigure the equipment and thereby correct the service degradation. For example, software at one or more cell sites may be updated to correct the service degradation.

In another example, if the automatic troubleshooting system 218 concludes that the source of the service degradation is the customer's UE device. The care agent may initiate a device trouble ticket. The device trouble ticket includes information prompting a device support team to manually investigate the reported service degradation. Information collected by the care agent from the customer may assist that investigation. The device support team may take a variety of actions to address the service degradation. In an example, the device support team may provide the customer with a software update or software patch to correct the service degradation.

An evaluation process for the automatic troubleshooting and resolution process 200 (FIG. 2C) uses nationwide datasets collected from a major US cellular service provider over an extensive period. Specifically, the care contact log data, or logs for the customer interaction phase, and the trouble ticket data, or logs for the ticket resolution phase, are used as the learning ground truth. In total the exemplary dataset includes over 237 thousands of care contact records and over 38 thousands of customer trouble tickets that reported service problems. All care data instances are used for training via the weakly-supervised learning method and evaluating the cell-level model. Additionally, around 19 thousands customer care reports are used where the root causes of the issues are verified to validate the effectiveness of the end-to-end reactive UE-level troubleshooting. Moreover, the average number of Radio Resource Control (RRC) connections, and the average utilization ratio of the Control Channel Element (CCE) as the cell-level KPI features, are used in evaluation. In the evaluation dataset, the cell-level KPIs are collected for more than 41 thousands cell sites with a granularity of 5 minutes. In addition, the UE-level features are extracted from the UE cellular session log data. Each log record represents one cellular session, ending with a termination code that indicates why the session is closed. There are 12 distinct codes in the evaluation dataset, each of which can be used as a categorical feature that describes the session status. Some example status codes include "Normal", "RAT Change," indicating the radio access technology is changed), "No up/down-link Data Used," etc. In total, more than 325 millions of UE-level network log records are processed for engineering the UE-level features.

FIG. 2J depicts an illustrative embodiment of an evaluation dataset for evaluating performance of a troubleshooting system for a cellular network in accordance with various aspects described herein. FIG. 2J(a) shows normalized information about a number of radio resource control (RRC) KPIs over a seven-day period. FIG. 2J(b) shows a control channel element (CCE) utilization ratio KPIs for the seven-day period before a care contact occurred. Control channel elements can be used to send a physical downlink control channel (PDCCH) from an eNB or gNB to a UE device. FIG. 2J(c) shows cell-level outputs in the upper portion of the figure and UE-level features in the bottom portion of the figure.

In FIG. 2J(a), FIG. 2J(b), and FIG. 2J(c), a real example is used to illustrate the behaviors of the system and method for handling a specific case. In this example, a customer contacted the customer care and reported service performance degradation. The root cause was not identified after a long period interaction between the customer and the agent.

As noted, FIG. 2J(a) and FIG. 2J(b) illustrate the RRC KPI and CCE Utilization KPI time series of the relevant cell sites for the past 7 days before the care contact occurred. In FIG. 2J(a), the raw RRC data series are normalized to [0, 1] using min-max normalization for visualization. The indications D1 to D7 on the abscissa represent the first to the seventh days of the historical window used for issue inspection. In the top panels of FIG. 2J(a) and FIG. 2J(b), the indications R1 and R2 represent the top two cell sites that were most frequently accessed by the user in the past week. From FIG. 2J(a) and FIG. 2J(b), we could observe a noticeable increase of connected users, corresponding to the RRC KPI, and traffic load, corresponding to the CCE KPI on cell site R1 during day 6 and day 7 of the illustrated time period compared with the preceding days. The changes are less noticeable on R2. However, those abnormal patterns themselves do not necessarily indicate anomalies on those cell sites, as similar patterns could also be observed in other scenarios such as the gathering of people, such as at a live concerts or sporting match, in the cells. A gathering of people in a common are served by one or two neighboring cell sites where the people are actively accessing the network with data sessions would evidence increased radio resource control and control channel element activity because of the communication between individuals' user equipment devices and the cell sites of the cellular network.

Next, the cell-level model 209 also investigates the neighboring cell sites of R1. FIG. 2J(a) and FIG. 2J(b) also show the KPIs of the top four cell sites in the neighborhood of cell site R1, i.e., designated 1st NB, 2nd NB, 3rd and 4th NB, which are ranked by the graph weights (proximity) to cell site R1. Cell site R2 is designated the 2nd NB. The figures show that 1st NB, i.e., the closest cell site, had an outage during Day 6 and Day 7, while the other more distant neighbors, look normal. The outage for cell site 1st NB is evidenced by the flat-line activity shown in FIG. 2J(a) and FIG. 2J(b) for that cell site on those days. Clearly, the KPI patterns on R1 were affected by the outages in the neighborhood at cell site 1st NB, although no outage was identified on R1. By using the graph-based model, the cell-level model 209 correctly learns the increasing network issue risk for R1, as shown in the top portion of FIG. 2J(c). The top portion of FIG. 2J(c) shows a network probability of failure, or risk, determined by the cell-level model 209.

The bottom portion of FIG. 2J(c) shows the session states of the preceding seven days for the UE. The rectangles represent the intervals of the cellular sessions of the UE that were carried by each of the two major reference cell sites, cell site R1 and cell site R2. Specifically, a designation Other/Idle means the device was carried by other cell sites or the device was idle; a designation R1/R2 Normal means the sessions with R1/R2 were closed normally; a designation R1/R2 RAT means the radio access technology (RAT) was changed. The simultaneous session occupations with cell site R1 and cell site R2 represent that the device was handed off from one cell site to another cell site.

By correlating the top portion and the bottom portion of FIG. 2J(c), several conclusions can be inferred. First, after the occurrence of the outages on Day 6 and Day 7, the total session length with cell site R2 was significantly reduced, and service for the device was mostly carried by R1. The changes might be due to the network setting updates for resolving the nearby outages.

Second, cell site R1 was significantly impacted by the outages in the neighborhood according to the cell level model predictions. From the raw KPI data, it can now be inferred that many other UE devices nearby were also moved to R1 from their original serving carriers or cell sites. Third, along with the carrier changes, the RAT was degraded due to the congestion on R1.

Thus, the strong temporal correlation between the cell-level states and UE-level states indicates the root cause of the reported issue was indeed a network problem, which could also be learned by the automatic troubleshooting and resolution process 200 using the feature modeling methods described above. In this example, the root network failures were on the neighboring cell sites rather than the major cell sites that served the user. However, as the impact of outages propagated, the actual influenced population size was larger than expected. In fact, the propagation of the network failure impact is usually triggered by the fault tolerance mechanism in current cellular networks. Handing over the customers from a problematic cell site to its neighboring towers can dramatically reduce the customer impact of eNodeB/gNodeB failures, although it may cause some congestion on the neighboring cell sites.

Evaluation of the Cell-Level Model

For the cell-level model 209, the cell-level network log data may be divided into two parts. The first consecutive 20 days of data may be used for training and the remaining consecutive 10 days of data may be used for validation. The mean-absolute-error (MAE) and the model time costs are used as the metrics. Then the model may be analyzed from both the spatial and temporal dimensions as follows.

Analysis on the Spatial Dimension.

In the spatial dimension, it is required to determine how many neighboring cell sites (k−1) should be considered when predicting the likelihood of network issues in the cells centered by a target cell site. The historical window size w of the KPI data may be fixed as 12 hours. Then the cell-level model may be trained with different graph sizes, ranging from k=1 to k=30, where k is the total number of cell sites considered for prediction in the area. For comparison, in one example, each model is trained with 10,000 batches and each batch contains 256 samples of the data window samples. The model is trained and executed, for example, on a 64-core CPU cluster. The whole training process on the CPU server may require approximately 2-10 hours for different values of k. Then 10,000 cell sites are randomly selected, and the mean absolute error (MAE) is measured. Further, the average inference delay, the inference cost for a single cell site at a single timestamp, of the cell-level models is measured.

Figure 2K:
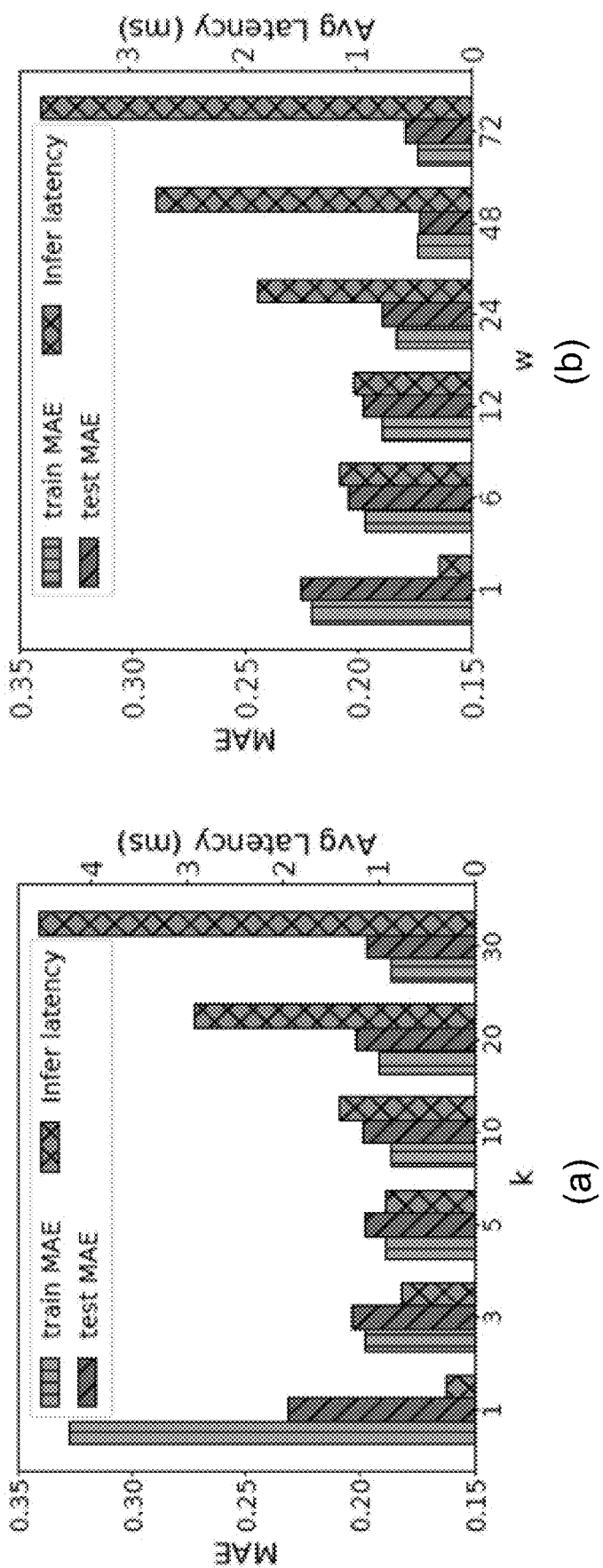
FIG. 2K illustrates evaluation results for the troubleshooting and resolution process for a cellular network in accordance with various aspects described herein.

FIG. 2K illustrates evaluation results for the troubleshooting and resolution process 200 for a cellular network in accordance with various aspects described herein. FIG. 2K(a) illustrates a comparison of different values of k. The result shows that the model yields much higher training errors when k=1, namely, it fails to learn the target well when only the target cell site is considered. The results suggest that the interaction of neighboring cell sites is an important feature when analyzing network issues on the cell level. In addition, FIG. 2K(a) shows that the model does not improve if more than five neighboring cell sites are included in consideration, while the inference latency grows linearly with k. The observation suggests that the transition of the abnormal states indeed exists but only among the nearest neighboring cell sites. The fault tolerance mechanism of cellular networks can dilute the impact of a single network fault on distant cells.

Analysis on the Temporal Dimension.

The historical window size w impacts the cell-level model. In an exemplary evaluation, k is set at 5 and the window size w is changed from 1 hour to 96 hours. A similar training and evaluation strategy as discussed above may be used. The comparison result is shown in FIG. 2K(b). The result illustrates that the model accuracy improves when longer time windows are used. The training and validation errors significantly reduce when w=48 hours. As w grows larger than 48 hours, the errors only reduce marginally. Hence, the historical data beyond 48 hours is less important for inferring current network issues. With w=48 and k=5, the model takes less than 3 ms for inferring the network state of one cell site on the CPU server.

Evaluation of the UE-Level Model

We evaluate the root cause diagnosing performance of the automatic troubleshooting and resolution process 200 using the real historical care contact data introduced above. Specifically, the system is evaluated by 5-fold cross validation and is compared with 5 other baseline diagnosis models. The training of NeTExp for each fold takes around 20 minutes to get converged. A brief introduction of the baselines is as follows.

ICCA (Auto):

Intelligent Customer Care Assistant System (ICCA) is a cellular issue diagnosis system. ICCA extracts the most discriminative UE-level event sequential patterns based on information gains by creating a model-based search tree with PrefixSpan. PrefixSpan is an algorithm used for mining frequent sequential patterns. A Gradient Boosting Decision Tree (GBDT) model is then applied for classification. In addition, ICCA also uses manually annotated features which are not available to us. For fair comparison, only the automatic feature extraction and learning modules of ICCA are compared.

Fisher Score+KNN:

The fisher scores of the cell-level and UE-level features are computed with respect to the root cause categories and the top n discriminative features are selected for classification. The optimal n in range [5, 1000] is searched and n=150 is selected in one example. Then a k-nearest neighbor (KNN) classifier is used for classification.

SRC:

Sparse Representation-based Classification (SRC) creates a feature library with profiles of the training data. At inference stage, the model reconstructs the input feature profile of the queried instance through the sparse encoding of the feature library. Then the decision is made by selecting the root cause category that minimizes the reconstruction error with the optimal coefficients.

CNN with only Cell-level or UE-level features: The same CNN classification model introduced above is applied while using the extracted features from only cell-level or UE-level observations, in order to illustrate the importance of the extracted features from both sides for troubleshooting.

Learning Time Costs of the Compared Models.

The same CPU cluster was used to train the compared models. In the offline training phase, the major time cost is the feature learning time. Specifically, the automatic troubleshooting and resolution process 200 (with k=5 and w=48) needs around 8 hours of training to get a converged cell-level model 209 for network condition feature learning. As a DNN model, the troubleshooting and resolution process 200 is expected to be significantly faster for training on GPUs. ICCA (with a 3-hour historical window and 10-layer model-based search trees) needs around 3.5 hours to train the PrefixSpan search tree for feature learning. The time cost for training a binary classifier using the learned features is much smaller. Specifically, the UE-level CNN model in the automatic troubleshooting and resolution process 200 takes around 6 minutes, the GBDT model in ICCA takes around 5 minutes, the Fisher score+KNN model takes around 6 minutes for training. The inference time cost of all above models is at millisecond level and thus is neglectable for the application use case. The SRC model does not need to be trained, while it takes around 0.7 seconds for encoding each instance at inference.

Figure 2L:
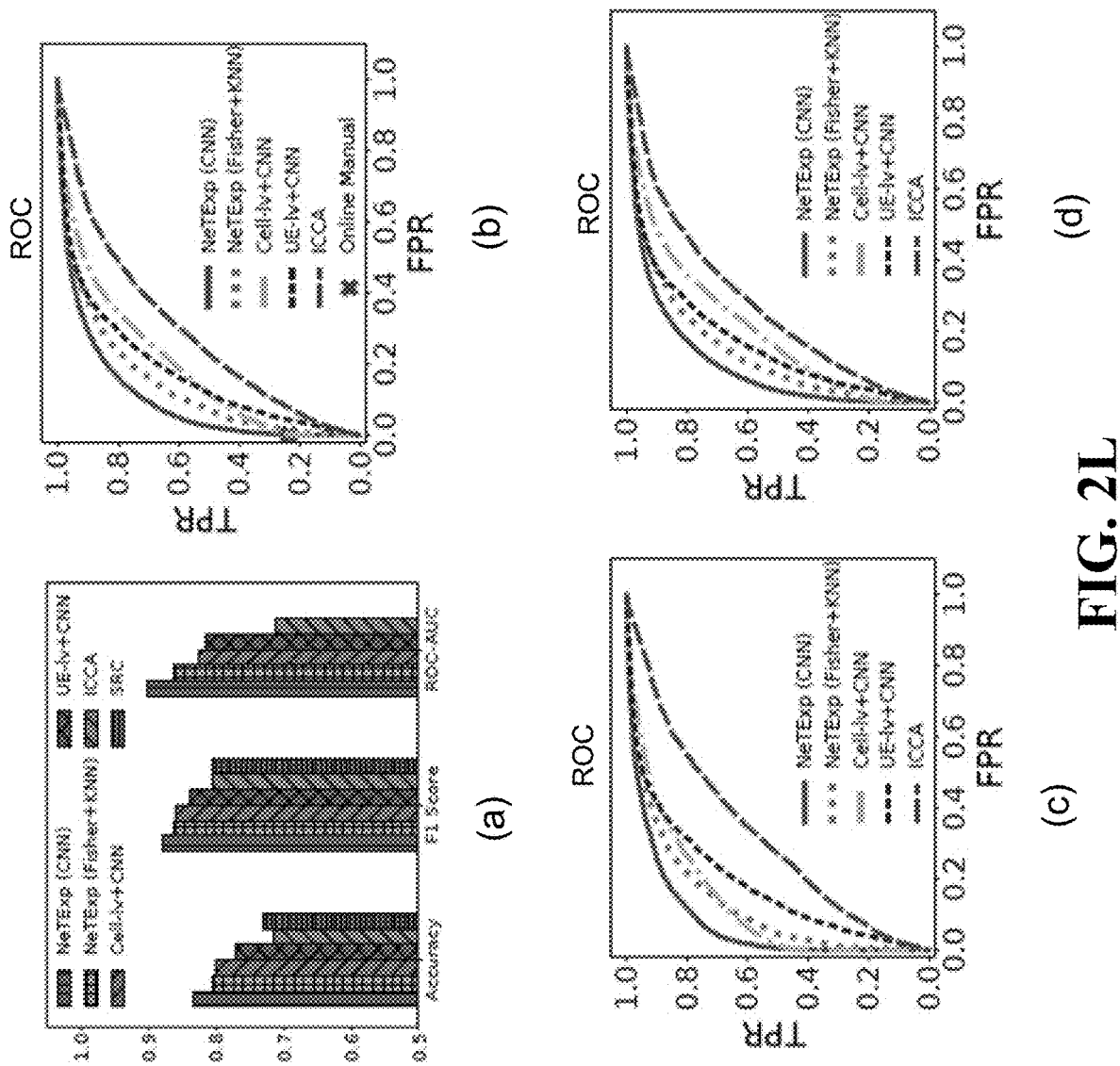
FIG. 2L illustrates evaluation results for the troubleshooting and resolution process for a cellular network in accordance with various aspects described herein.

FIG. 2L illustrates evaluation results for the automatic troubleshooting and resolution process 200 for a cellular network in accordance with various aspects described herein. The overall 5-fold validation results (Accuracy, F1-score, RoC-AUC) are shown in FIG. 2L(a). The ROC is a receiver operating characteristic curve shows performance of a classification model at all performance thresholds. The RoC-AUC is the area under the RoC curve and measures the two-dimensional area under the RoC curve. Larger area corresponds to better performance.

The results show that the automatic troubleshooting and resolution process 200 (labelled NeTExp) outperforms other baseline methods for different classification metrics. In addition, as a much simpler and distance-based model, Fisher Score+KNN with the features learned by NeTExp also yields good classification results. This shows that the feature engineering methods in NeTExp provide discriminative features for root cause classification. FIG. 2L(b) presents the ROC curves of the compared methods, where the network-side issue is the positive class. The cross mark in the figure represents the ratio of network problems that could be manually identified during the online troubleshooting phase. Since many non-outage network issues are difficult to be timely recognized, the recall of the manual network issue identification is low, such as less than 25%. For the remaining 75% cases, the issues are eventually resolved through offline inspection. The result clearly shows that the automatic troubleshooting and resolution process 200, NeTExp, significantly improves the recall of the network identification without introducing a large fraction of false positives. Note that some false positives may not be real negatives, i.e., non-network-related issues. This is because that not all network issue cases were successfully identified due to the limitations of the traditional troubleshooting procedures being used in practice.

FIG. 2L(c) and FIG. 2L(d) present the breakdowns of the performance for different groups of troubleshooting samples. FIG. 2L(c) shows results for so-called easy cases, where the network issue can be recognized during the online troubleshooting process. FIG. 2L(d) shows results for so-called hard cases, where the issue was forwarded by the agent creating a ticket because the agent could not resolve the issue online and more effort was needed to recognize the issue.

Specifically, the dataset is divided into two subsets based on whether the ticket, if it is network-related, was eventually resolved in the customer interaction stage (considered the "easier" cases) or in the ticket resolution stage (considered the "harder" cases). The results show that the features learned from the cell-level data can only work well for identifying the "easier" network issue cases, such as a direct network outage, while they fail to work well for the "harder" cases, such as indirect issues or chronic issues. On the other hand, the UE-level features can well describe the symptoms on individual user device regardless the types of the network issues. But the symptom on the UE-side itself is insufficient for locating the problem, as different problems may produce similar symptoms. Therefore, the automatic troubleshooting and resolution process 200, NeTExp, which correlates both the cell-level and UE-level observations, provides best network issue detection performance.

FIG. 2M illustrates evaluation results for the automatic troubleshooting and resolution process 200 for a cellular network in accordance with various aspects described herein. FIG. 2M illustrates results of analysis after using the disclosed system and method to troubleshoot historical cases that are collected over an exemplary one-month time period. The dataset includes online tickets and offline tickets and only uses tickets whose root causes can be identified. FIG. 2M(a) presents metrics including Accuracy, F1 and ROC-AUC scores for different categories of service problems. Accuracy, F1 and ROC-AUC are different metrics to measure performance. The y-axis represents scores and higher score corresponds to better performance. The bars in the bar chart labelled NetExp (CNN) correspond to the exemplary system and method in accordance with various aspects described herein. The other bars in the bar chart correspond to other methods that were compared.

Similarly, FIG. 2M(b) presents of the models for different categories of service problems including cellular data issues and voice call issues. The results show that the automatic troubleshooting and resolution process 200, labelled NeTExp in the drawing figure, outperforms the baseline methods for all different issue categories.

Figure 2N:
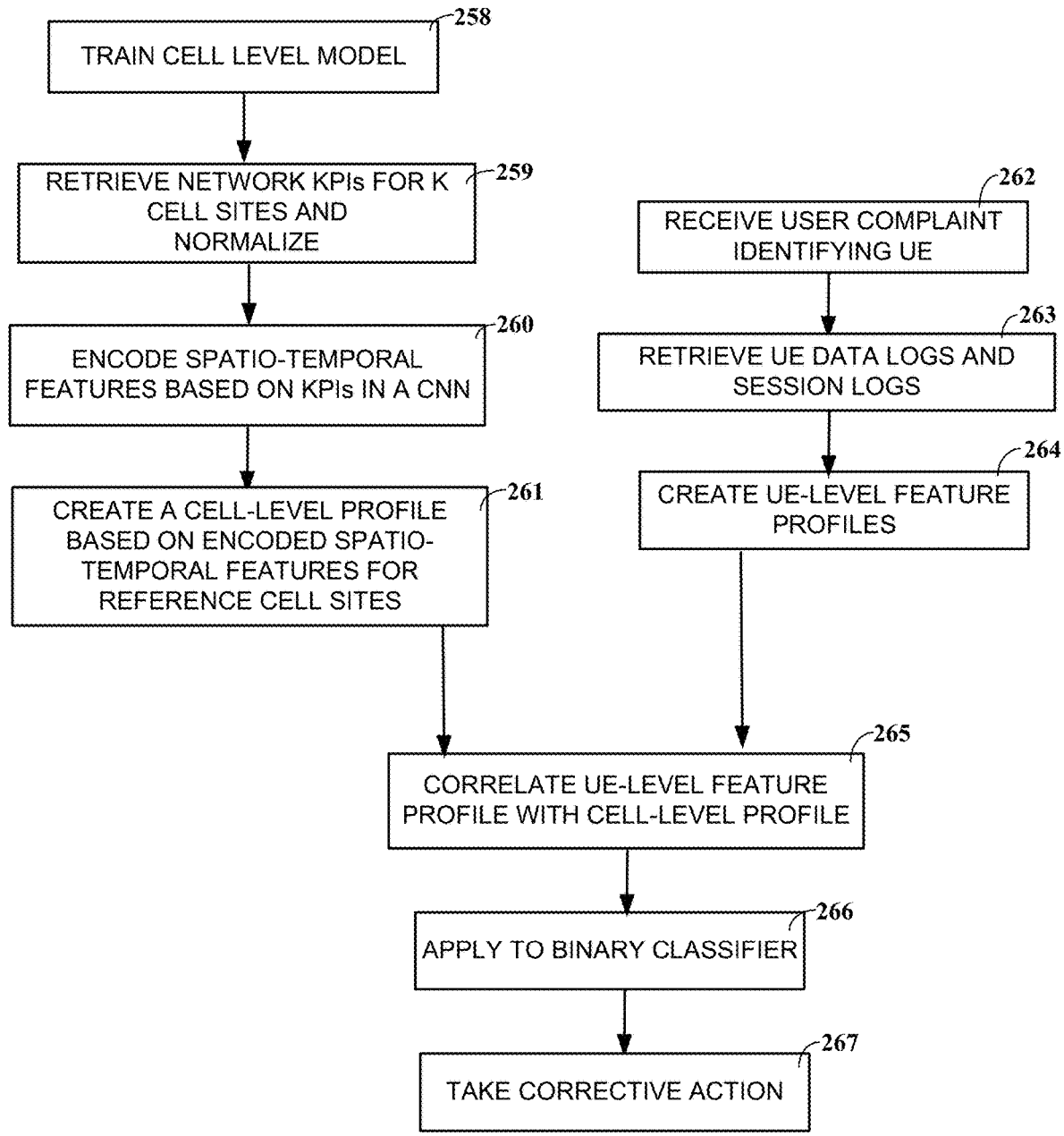
FIG. 2N depicts an illustrative embodiment of a method in accordance with various aspects described herein.

FIG. 2N depicts an illustrative embodiment of a method 256 in accordance with various aspects described herein. The method 256 may be used for troubleshooting service issues reported by customers in a cellular network or other telecommunications network. The method 256 may be used to identify a source of the service issue in either a network device such as a base station, switch or router, or in a user device such as a smartphone or other user equipment of a customer.

At step 258, the method 256 includes selecting and training a cell-level model. In an exemplary embodiment, the cell-level model 209 of FIG. 2G may be employed. Any other suitable machine learning model may be used, including a graph-level convolutional neural network in which each node represents a cell site.

At step 259, network key performance indicators are retrieved for cell sites in the cellular network. In an embodiment, KPIs for a selected cell site are retrieved and KPIs for the nearest-neighbor cell sites are retrieved for a local area and processed together in a matrix. The KPIs reflect performance of the cell sites over time. The data may be normalized in any suitable fashion to improve anomaly detection accuracy.

At step 260, spatio-temporal features of the KPI data are encoded in a convolutional neural network (CNN). Further, the processed features of all cell sites may be aggregated in one or more temporal CNNs and one or more spatial CNNs to generate a feature representation of network conditions of the cell sites in the cellular network. The cell level profile are imputed to a cell-level machine learning model for identifying and correcting service issues in the cellular network.

Separately, at step 262, a user complaint about a service degradation in the cellular network. The user complaint may be received, for example, by a customer contacting a care agent of the network operator of the cellular network. The care agent is responsible to work with the customer to collect information about the service degradation, identify a source of the service degradation and correct the service degradation. The source of the service degradation may be in an area which the care agent can readily address, such as network information of the customer or provisioning information of the customer. Further, the source of the service degradation may require engagement of a network support team to correct a network issue or a device support team to correct a device issue with the user equipment (UE) device of the customer.

At step 263, the method 256 includes retrieving data logs and session logs for the UE device of the customer. The retrieved information may include, in some examples, timestamp information for a data session by the UE device with a cell site, time duration information for the data session, information identifying the cell sites that were accessed during the data session, and session status information for the data session. Further, information about session usage features may be retrieved, for instance, usage information for a group of the most frequently accessed cell sites of the cellular network. At step 264, UE-level feature profiles may be created using the UE data logs and session logs and other UE-level information.

At step 265, the UE level feature profile of step 264 may be correlated with the cell-level profile of step 261. In embodiments, a historical time window, such as a one-week time window, may be used to construct the feature profiles. For example, a sliding time window may be applied to the pretrained cell level machine learning model to extract the cell-level profile. Any suitable time duration may be used for the historical time window.

At step 266, the cell-level profile and the UE-level profile are applied to a binary classifier. In an exemplary embodiment, a CNN classifier may be used as a user-level model. The learning target for the CNN classifier is whether the UE's problem is caused by a network-side issue or a device-side issue. This UE-level model forms a direct interface for the care agents to learn whether a reported problem is a network-side issue or a device-side issue. The UE-level model provides to the care agent an indication of the source of the problem, whether in the cellular network or in the user equipment of the customer whose complaint was received at step 262.

Upon receiving the indication of the source of the problem, the care agent may take corrective action. For example, the care agent may issue a service ticket to a network support team to address the network issue. The network support team may, in turn, modify hardware, software or both of one more network components such as cell sites to correct the service degradation reported by the customer. The care agent may further issue a service ticket to a device support team to address a device issue. The device support team may, in turn, modify software or other aspects of the UE device of the customer to correct the service degradation reported by the customer.

Figure 2O:
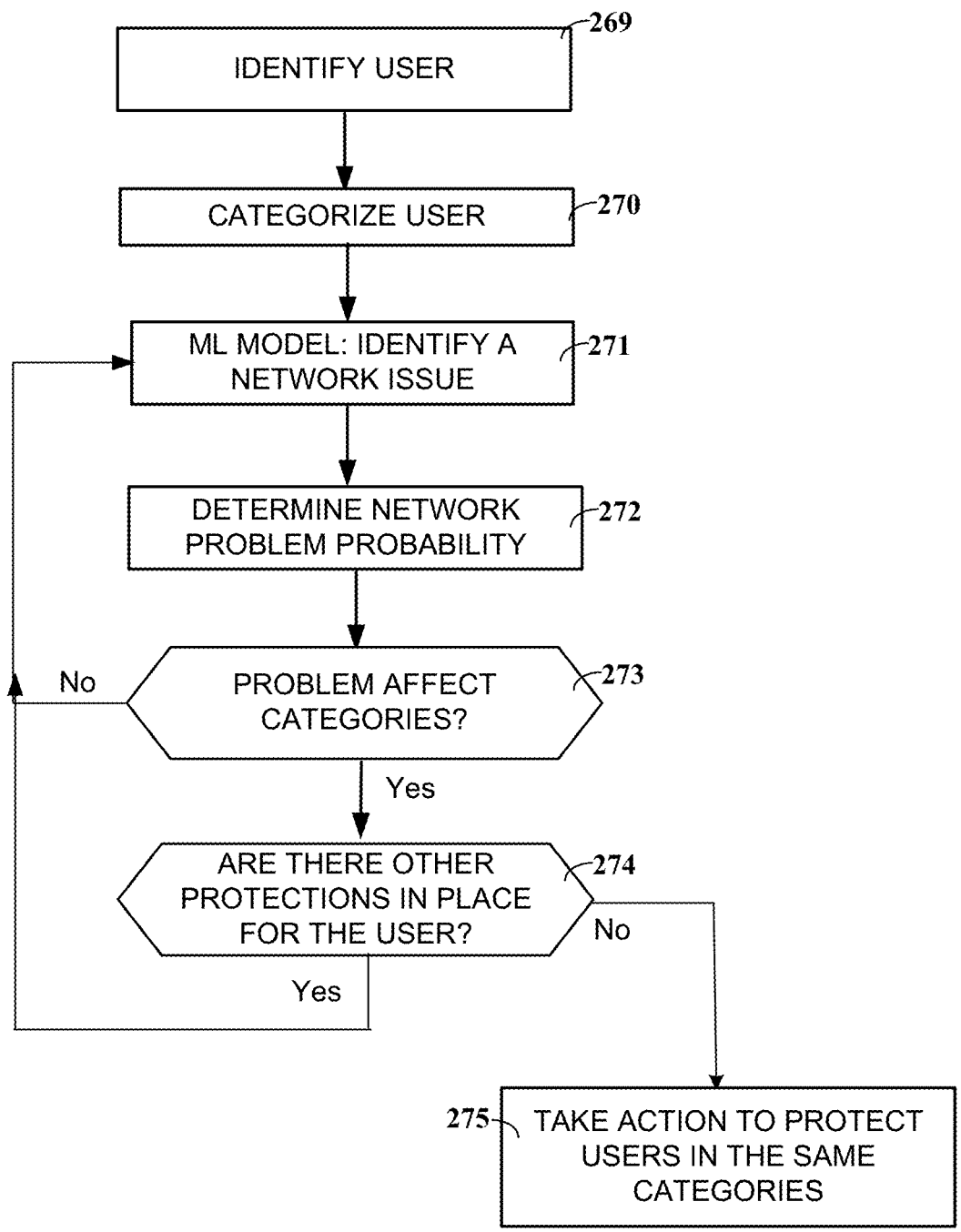
FIG. 2O depicts an illustrative embodiment of a method in accordance with various aspects described herein.

FIG. 2O depicts an illustrative embodiment of a method 268 in accordance with various aspects described herein. The method 268 may allow for use of automatic artificial intelligence (AI) and machine learning (ML) management of user experiences in a communication network such as a cellular network. The method 268 may rely on a machine learning model such as the ML model developed for the troubleshooting system 208 of FIG. 2D to characterize users of the cellular network into categories and manage user experience for a user based on categories in which the user is located. The method 268 makes use of an ML powered automation system to categorize customers into various groups and manage user experience based on their categories. The method 268 leverages the ML model disclosed herein to help determine the root causes of service degradations in a cellular network that have impacted customers and then manage customer experiences according to the identified root causes. The management of customer experiences may prevent disruption for the customer before the customer is even impacted by a service degradation. Or the management of customer experiences may minimize disruption for the user due to a service degradation.

At step 269, the method 268 includes identifying a user. Any suitable identification technique of information may be used. For example, the user or the UE device of the user may be identified by a telephone number assigned to the device or to the user, or by a mobile identification number or serial number. Further, the user or the device may be identified by an account number of an account maintained by the network operator.

At step 270, the user or the user device is categorized. The user (or device) may be categorized in any suitable fashion, into any suitable category or plurality of categories. For example, the user may be categorized according to physical location on the network. All users at or near a particular network location may be assigned the same category, and location may be defined by, for example, a network address or sub-address. In an example, all users having UE devices attached to base stations serving a particular area or subnetwork may be categorized together.

In another example, users may be categorized according to one or more applications the users have installed on a UE device or actively use on a UE device. For example, all users who have a virtual reality application installed or active on a UE device may be categorized together. In another example, users who have an assigned priority in the network, such as users employing a wireless priority service or engaged in high-priority sessions such as voice calls or real-time audio-visual streaming, may be categorized together. In another example, users may be categorized according to a quality of service (QoS) class identifier (QCI). QCI is a mechanism used to ensure carrier traffic is allocated an appropriate QoS. For example, conversational voice and conversational video may have a highest priority QCI. Buffered video may have a lower priority QCI. Users or applications having the same QCI class may be categorized together in an example.

Categorization at step 270 may be based on how vulnerable a user is to particular types of network events. In particular, users who will be impacted the same or similarly by a network event may be categorized together. For example, it may be determined by the ML model that a network event has a particular root cause. Further, that root cause or network event may be determined to have a particular effect on a particular user. Some or all categories associated with particular user may be used to identify other users in the same or related categories. Based on that known effect on one or more particular users, action may be taken to prevent or minimize the same effect on other users in the same category or categories. The method 268 may infer how a user's experience might be affected by a particular event without knowing exactly what happened.

At step 271, the ML model such as the troubleshooting system 208 of FIG. 2D, may be used to identify a network issue or situation. For example, the ML model may identify a hard outage in the cellular network in which one or more base stations or other network element becomes unavailable. Many customers in many categories may be affected by such an outage in the network. In another example, the ML model may identify that a high-performance portion of network service is unavailable to users in a particular geographic area, disabling service for a user of an extended reality application in that geographic area.

At step 272, the method 268 includes determining a network problem probability. For example, the top portion of FIG. 2J(c) shows a network probability of failure, or risk, determined by the cell-level model 209 of FIG. 2G. Referring again to FIG. 2J(a) and FIG. 2J(b), these figures give some idea of a network-side observation model output and the lower portion of FIG. 2J(c) provides a user profile. FIG. 2J(a) in this example illustrates the raw KPIs observed for a number of neighboring cell sites in a user's location. In these figures, two cell sites are illustrated including first cell site R1 and second cell site R2. Further, the top four cell sites in the neighborhood of cell site R1, i.e., designated 1st NB, 2nd NB, 3rd and 4th NB, are ranked in FIG. 2J(a) and FIG. 2J(b) according to their weights, or proximity in this example, relative to cell site R1.

FIG. 2J(a) and FIG. 2J(b) illustrate some anomalies, or some outage, occurring on Day 6 and Day 7. For example, normalized radio resource control (RRC) KPIs and control channel element (CCE) utilization ratio KPIs for cell site R1 and cell site R2 each have a relatively high value on Day 6 and Day 7. Similarly RRC KPIs and CCE KPIs for cell site designated 1st NB have a flatline value for Day 6. Cell sites designated 3rd NB and 4th NB are generally unchanged on Day 6 and Day 7. Without a model, it is unclear how to interpret the variation in KPI value.

In FIG. 2J(c), the upper portion shows values for a network problem probability that is learned by the ML model for two different cell sites, cell site R1 and cell site R2. The network problem probability is labelled R1 Risk and the network problem probability for cell site R2 is labelled R2 risk. The lower portion of FIG. 2J(c) illustrates an aspect of user in relation to the network problem probability. This illustrates what happened on the user side at the UE device. The lower portion of FIG. 2J(c) illustrates the intervals of the cellular sessions of the UE that were carried by each of the two major reference cell sites, cell site R1 and cell site R2. Specifically, a designation Other/Idle means the device was carried by other cell sites or the device was idle; a designation R1/R2 Normal means the sessions with R1/R2 were closed normally; a designation R1/R2 RAT means the radio access technology (RAT) was changed. The simultaneous session occupations with cell site R1 and cell site R2 represent that the device was handed off from one cell site to another cell site.

After the occurrence of Day 6 and Day 7 outages on cell site designated 1st NB, the risk of a network issue at cell site R1 increases dramatically. The network problem probability stays high over Day 6 and Day 7. In contrast, the network problem probability for cell site R2 remains relatively low. The cell site designated 1st NB is the nearest neighbor cell site to cell site R1. After the occurrence of the outages on Day 6 and Day 7, the total session length with cell site R2 was significantly reduced, and service for the device was mostly carried by R1. Thus, the ML model determines from KPI data for the cell sites in the local area, an outage or disruption at the cell site designated 1st NB causes substantial disruption on cell site R1 but only slight disruption on cell site R2.

Referring again to FIG. 2O, at step 273, the method 268 determines if a network problem identified at step 271 and step 272 may affect one or more categories of users. For example, the method may identify one or more users who were impacted by the network problem and identify one or more categories in which those users are categorized. Other users in the same categories may be affected as well. In an example, a user was affected by a hard outage by losing all service in the region served by a particular cell site. The user is assigned to a particular category of users served by that cell site at the time. Step 273 may include identifying all other users in that particular category. Such identification may be used to mitigate further problems for those users in the same category.

Further, step 273 may include determining the nature of the effect on the users affected by the network problem and relate that effect to other users. In an example, a first user is affected by a service degradation that only limits high-throughput applications, such as extended reality gaming in which the user was involved at the time. High throughput applications become unavailable to users in a portion of the network for a time. That first user is in a first category of users active on that cell site at the time of the outage. That first user is also in a second category of users active in extended reality gaming at that time on the cell site. However, a second user who also is in the first category of users served by that cell site at the time but is not in the second category of users active in extended reality gaming, may not be affected by the particular network problem. The information about network problems and categorization of users can be used to manage the experience of users on the cellular network.

If, at step 273, the particular network problem does not affect any categories of users, or if the category does not include any other affected users, control returns to step 271 to monitor for further network issues.

If, on the other hand, at step 273, one or more categories of users are determined to be affected, at step 274, the method 268 determines if there are other protections in place for affected users. For example, referring again to FIG. 2J(c), in the lower portion of the figure, during and after the disruption on Day 6 and Day 7, much less traffic is conveyed on cell site R2 and more traffic is conveyed on cell site R1. The volume of traffic on R2 is increased presumably because of the disruption on Day 6 at cell site designated 1st NB. This is a cell site neighboring cell site R1 and traffic from cell site designated 1st NB is rerouted to cell site R1.

In this case, even though there is an apparent outage at cell site designated 1st NB, the network has in place a protection for users that would be affected by the outage. Such users are handed off to or rerouted to a neighboring cell site, cell site R1 in this case. The lower portion of FIG. 2J(c) reflects the increased traffic on R1.

Other types of network protections, including fault tolerance mechanisms, can serve to back up or accommodate network failures. For example, as indicated by the R2 RAT and R2 RAT segments of the lowers portion of FIG. 2J(c), one network protection includes a switch to a different radio access technology. For example, if a fifth generation (5G) cellular gNodeB becomes unavailable, a collocated 4G eNodeB may be substituted to maintain service for UE devices in the area. Other network protections are designed into the network is as well.

If, at step 274, such network protections are available and may be relied on to maintain a quality of service (QoS) and quality of experience (QoE) for a customer, control returns to step 271 to continue monitoring for network failures.

On the other hand, if no suitable network protection is available, at step 275, the method 268 includes operations to take action to protect users in the affected categories. Actions may be taken to isolate the users in an affected category from the service degradation. Such actions may be taken prophylactically to prevent a service disruption or degradation for other users in the affected category. Such actions may be taken to maintain a continuous user experience for other users in the affected category. Any suitable actions may be taken including rerouting traffic to the user through the network or modifying the user connection to the network such as switching to a different radio access technology. In another example, if a user is only provisioned for a first set of services but one service may be temporarily interrupted, the provisioning for the user may automatically be temporarily upgraded to a higher grade of service to allow access to comparable service to maintain a continuous user experience on the network. In embodiments, the severity of the action take at step 275 is related to the severity of the service degradation. Thus, if the service degradation includes a hard outage, step 275 may include immediately handing over communication with the user's UE device to another cell site to continue a data session on the other cell site. In the alternative, if the service degradation is a temporary unavailability of a particular currently-assigned QCI for the UE device on the current cell site, step 275 may include modifying the QCI to at least as high a priority so that the user's experience is consistently maintained.

In some embodiments, the machine learning system in accordance with aspects described herein may be used to identify customers on the cellular network who are impacted by a specific event. Further, the machine learning system may be used to recommend recovery actions after a specific event, based on the nature of the event. In embodiments, based on the nature of event categories, specific mitigation actions may be recommended or executed to help customers recover from the impact of the events.

Figure 2P:
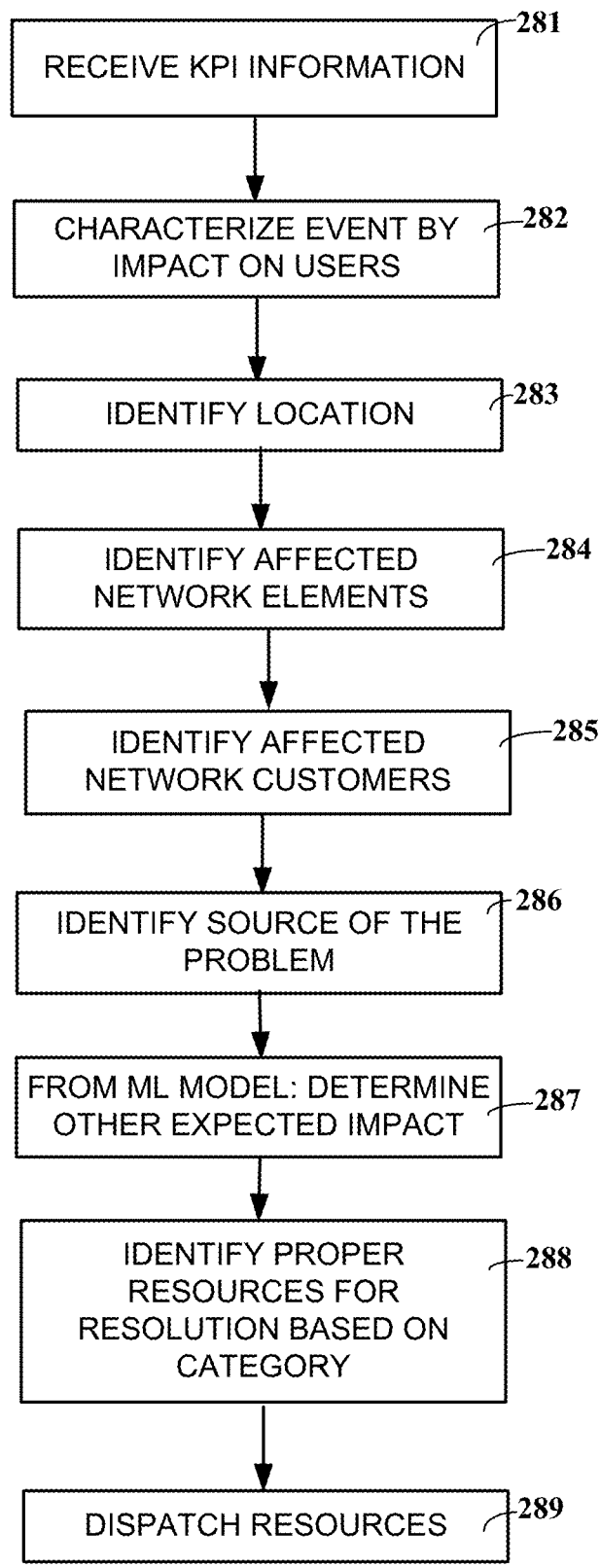
FIG. 2P depicts an illustrative embodiment of a method in accordance with various aspects described herein.

FIG. 2P depicts an illustrative embodiment of a method 280 in accordance with various aspects described herein. The method 280 of FIG. 2P may be used to permit a network operator associated with the cellular network to better manage events of service degradation in the cellular network to minimize impact on the customer. Such events are external events and occur externally to the cellular network. That is, the events occur due to presence or absence of an external agent such as a weather event, a power outage or a vehicle crash that subsequently affects a component of the cellular network. This is distinct from internal events which arise to an issue or situation or failure occurring initially solely within a component of the cellular network, such as a failure of a cell site, a misaligned antenna on a cell site, or incorrect software loaded on a switch of the cellular network. Conventional approaches do not precisely and effectively identify individual customers who are impacted by an event.

Illustrative embodiments may be applied using artificial intelligence (AI) and one or more machine learning (ML) models for identifying customers of a telecommunications network who are impacted by a given event and recommending recovery actions based on the nature of the event. Such events may include natural disasters and other events external to the telecommunications network. The events may be automatically categorized. Based on event categories, various mitigation actions may be recommended or executed to help customers recover from the impact of the event.

Various events can impact portions of a cellular network. One example of such events is a natural disaster which can temporarily disable a part of the network such as a central office that serves as a switching center. Even though damage may be confined to a particular location and set of devices, the disruption to the overall cellular network can cover a much broader area. Some areas that are directly affected by experience network outages. Other areas are indirectly affected due to network changes and maintenance work done during and after an event. In a sense, the cellular network operates like a mesh and if a portion of the mesh is damaged or disabled, the effects extend to even remotely related portions of the network or the mesh.

Collecting information about actual disruption within the network can take a substantial amount of time, such as one week. Having the network disabled or damaged during that amount of time may not be acceptable from a business perspective. Moreover, during a natural disaster, communication facilities including cellular networks form essential infrastructure for responding to the natural disaster. Any delay in troubleshooting the network is problematic.

FIG. 2P illustrates method 280 for managing events such as a natural disaster that can disrupt the network but while reducing the impact of the event on customers. The method 280 relies on a machine learning system such as the automatic troubleshooting system 218 of FIG. 2C. The automatic troubleshooting system 218 in embodiments includes a proactive cell-level network state prediction model and a reactive UE-level troubleshooting inference model. In embodiments, method 280 uses a machine learning model and the output of the model includes a prediction of network status and effects on users following an event such as a natural disaster or other event that is unexpected and causes an outage of one or more portion of the network. The outage may affect one or more cell sites, one or more central offices or other switching facilities, or other functional features of the cellular network.

Step 281 may include receiving key performance indicator (KPI) information for a network or a portion of a network. Any suitable KPI information may be received and processed. Such information may include information about cell loading for one or more eNodeB devices or gNodeB devices, cell throughput information describing levels of traffic in one or more cells, cell handover information, etc. The KPI information may include any other information about operation and functioning of the overall network, a portion of the network or subnetwork or individual network elements such as an eNodeB, a switch or router, a network gateway etc.

At step 282, the KPI information may be analyzed to identify any operational problems in the network. Such operational problems may be due to a natural disaster or some other event, such as a hurricane affecting part of the network serving a specified region. Further, the KPI information may be used by a properly trained machine learning model to estimate the impact of the natural disaster or other event and how the event will impact users experience using the network. For example, a hurricane may damage equipment serving a first part of a network including a first group of users. A second, adjacent, part of the network may be undamaged by the hurricane, but performance of the second part of the network may be affected by the damage to the first part of the network. For example, data sessions that may be completed by UE devices with cell sites of the first part of the network may instead be routed through cell sites of the second part of the network, causing an increase in KPIs such as traffic volume and a decrease in KPIs such as throughput in the second part of the network. The machine learning model in accordance with aspects described herein may predict those affects outside the first part of the network and may permit rapid network modifications to accommodate the changes to parts of the network that were not directly affected by the hurricane or other event.

In embodiments, the event may be assigned to one or more event category. As noted, any suitable categories may be defined and used. Further, as additional information about the event is received by the model or otherwise, the categorization may be modified or updated to reflect the additional information. For example, an event initially categorized as a flood may be further categorized as an infrastructure failure after information about recent weather events becomes available.

At step 283, the method 280 includes a step of identifying a location of the event. In embodiments, the model may provide information identifying the location of the event or identifying network elements impacted by the event. In embodiments, the location may include a geographical location, such as specified by GPS coordinates. Also or in addition, the location may include a network location such as identifying information for a subnetwork within the overall network.

At step 284, the model operates to provide a prediction about network elements affected by the event. The model may provide a prediction about likelihood of network issues that impact customers in cell sites of the cellular network. The model may retrieve information about current usage of UE devices in the network. Further, the model may identify a source of the service degradation. The identification may be based on the prediction about likelihood of network issues and the current usage of UE devices.

Further, the identification of affected elements may be based on the categorization assigned to the event at step 282. For example, if an event is categorized as a flood and as a natural event due to a hurricane, those categories may prompt the method 280 to identify antennas at cell sites as affected network elements. Antennas are often positioned in the open and relatively high off the ground, where they may be susceptible damage in a hurricane.

In an example, embodiment, network elements likely to be affected by the same event may be grouped together. For example, a group of cell sites commonly located in a flood zone are likely to be affected if the area of the flood zone floods. The network elements may be grouped together or categorized together as being likely to be affected by the flood. Further, the group of cell sites or other network elements may be assigned to subgroups based on susceptibility to flooding. If a flood occurs but only affects a first group of cell sites, the category which includes just those cell sites may be identified as affected network elements.

Still further, network elements may be grouped or categorized as affected network elements according to network function. For example, a single cell site may include several eNodeB and gNodeB devices of the cellular network. Those may be grouped together as performing the same function in a radio access network. The single cell site may also include a backhaul switch for connecting the eNodeB and gNodeB devices with a backhaul network. The backhaul switch maybe categorized with other network components that perform the same or similar function in the network.

At step 285, the model may identify affected customers of the network, for example, based on the category assigned to the event. In an embodiment, the model maintains an associated library of events and categories, along with categories of customers that may be affected by a particular event. The categories may have any degree of granularity and include a variety of sub-categories or axes of information. For example, an event may be categorized according to a type such as natural disaster, a sub-type such as flood, and be further categorized as to location and by individual customers or groups of customers associated with that location.

In some embodiments, the method 280 may include identify types of events likely to occur and identifying users who are vulnerable to such events. Customers who are all commonly vulnerable to a type of event may be grouped or categorized together. For example, a group of customers who together reside in a common neighborhood may be susceptible to flooding in that neighborhood. If a flood even occurs and affects a network component, the neighbors are categorized with the affected component and are identified at step 285 as affected network customers. Thus, the method 280 permits identifying customers who are impacted by a given event and recommending recovery actions based on the nature of the events.

At step 286, the model may provide information about a potential source of the event. In embodiments, the model may provide detailed information about damage or other affects of the event. As an example, an event may affect one antenna of a base station at a cell site, where the antenna serves one segment of the service area of the base station. Damage to the antenna may limit the ability for the base station to communicate with UE devices in the one segment of the service area. The model may respond to current KPI data for the cell site and other cell sites. Moreover, the model may be trained on log data for the cell site and a set of, for example 5 neighboring cell sites. More particularly, in accordance with embodiments described herein, the model may be trained using historical usage data for the plurality of cell sites of the cellular network, user mobility data, performance metrics for one or more cell sites of the plurality of cell sites, and customer care contact data and trouble ticket data for previous reports of service degradation. At step 286, the model may provide information about a particular failing component or damaged component of a cell site, or simply identify the damaged cell site.

At step 28s7, the model may provide prediction information about other impacts that may be expected due to the event. The prediction information may be based on the categories assigned to the event. For example, some network components such as switching sites or cell sites may be directly affected by the event. However, other components may be indirectly affected. Indirect effects arise because communication traffic gets shifted from the directly affected components. For example, if a cell site is not functional, UE devices in the area will connect with other neighboring cell sites for network access. In another example, repair and replacement of the directly affected network components may require taking some other components offline for a time, indirectly affecting the service availability of those other components.

In the example, the affected cell site is grouped in one or more categories with the neighboring cell sites. Based on the event involving the affected cell site, the other cell sites grouped in the same category may be determined at step 287 to be expected to be impacted. The model may further recommend reviewing the function and status of the other cell sites in the same category based on the affected cell site being a member of that category. Any suitable mitigation or corrective action may be taken based on the categories associated with the affected cell site.

At step 288, the method 280 includes receiving from the model prediction information about proper resources for resolution of the event. In embodiments, the model relies on the categorization of the event for deciding what resources are most appropriate for the situation. For example, if the model determines that a particular component is damaged and needs repair or replacement, the model may provide at step 287 a prediction identifying the damaged component.

The component may be categorized with other likely-affected components. The damaged component may further be categorized with resources recommended for making the repair considered to be necessary. If a crew with particular equipment such as a lift-bucket is required to effect the repair, the model may provide at step 288 a prediction identifying the repair crew and needed repair equipment. Similarly, if the model concludes that a software update is required for a failing component or if a repair can be effected through control of network facilities or modification of network configuration for the failing component, the model provides the necessary information. Again, the information about the resources to correct the failure may be included in a category with the event, its description, identification of any likely affected other components, etc.

At step 289, the resources necessary to resolve the event and its effect on the network are dispatched. For example, if the model determined that a repair crew with a lift-bucket is required, the crew may be selected, designated and assigned to the repair job. The progress of the crew may be monitored to determine when the repair is complete and indirectly affected network facilities may be activated or reactivated. If a network configuration update is required that only involves human interaction with network control facilities to make the necessary changes, the model may provide the necessary information and monitor the progress. Some repairs following some events may require a series of repairs or other discrete steps. The model may recommend each step in sequence and monitor network KPIs and device KPIs to determine completion.

While for purposes of simplicity of explanation, the respective processes are shown and described as a series of blocks in FIG. 2N, FIG. 2O and FIG. 2P, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of troubleshooting and resolution process 200, and methods presented in FIGS. 1, 2A through 2P and FIG. 3. For example, virtualized communication network 300 can facilitate in whole or in part determine whether the root cause of a user-reported service issue in a communication network is from the network side or the device side through deep neural networks.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
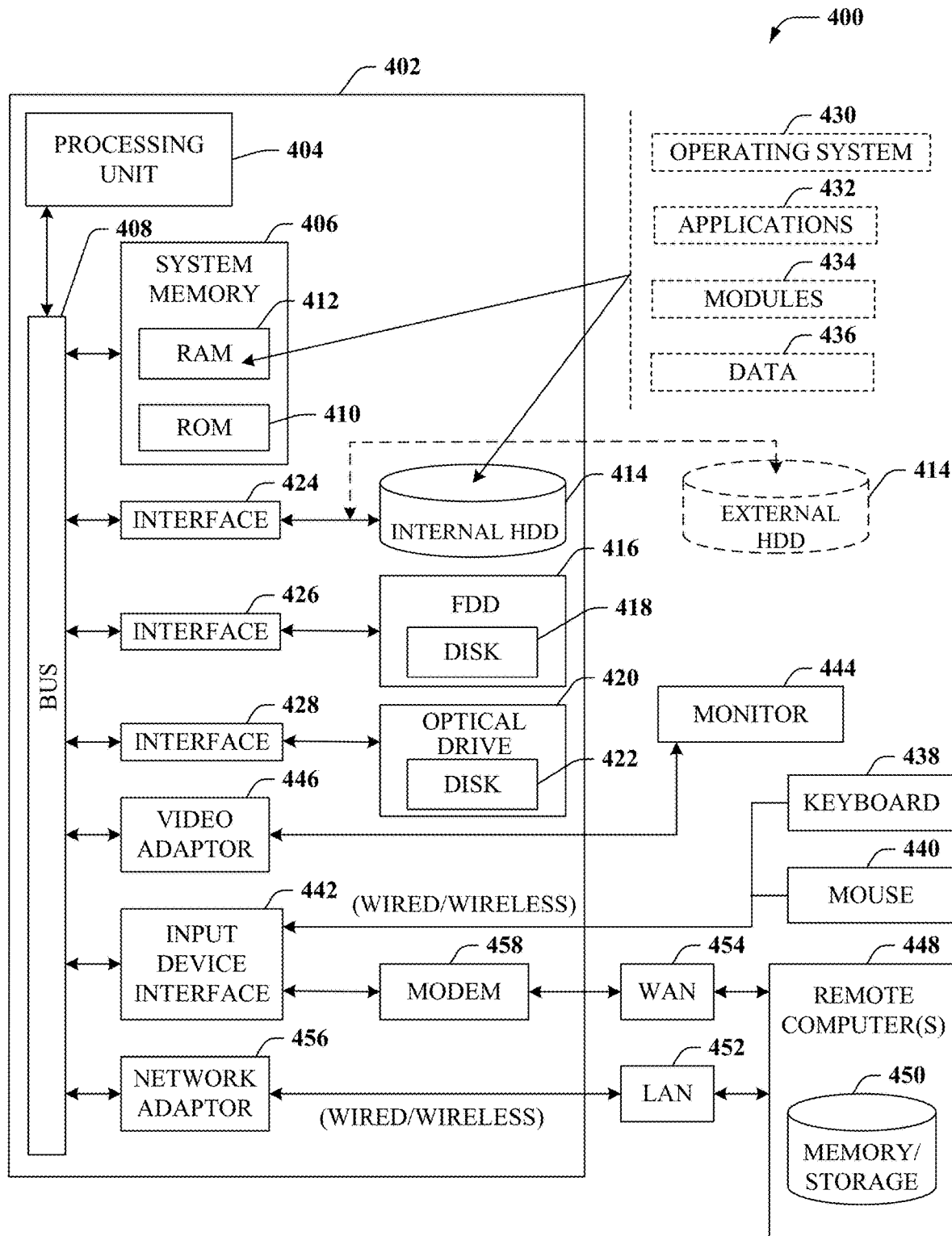
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part determine whether the root cause of a user-reported service issue in a communication network is from the network side or the device side through deep neural networks.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
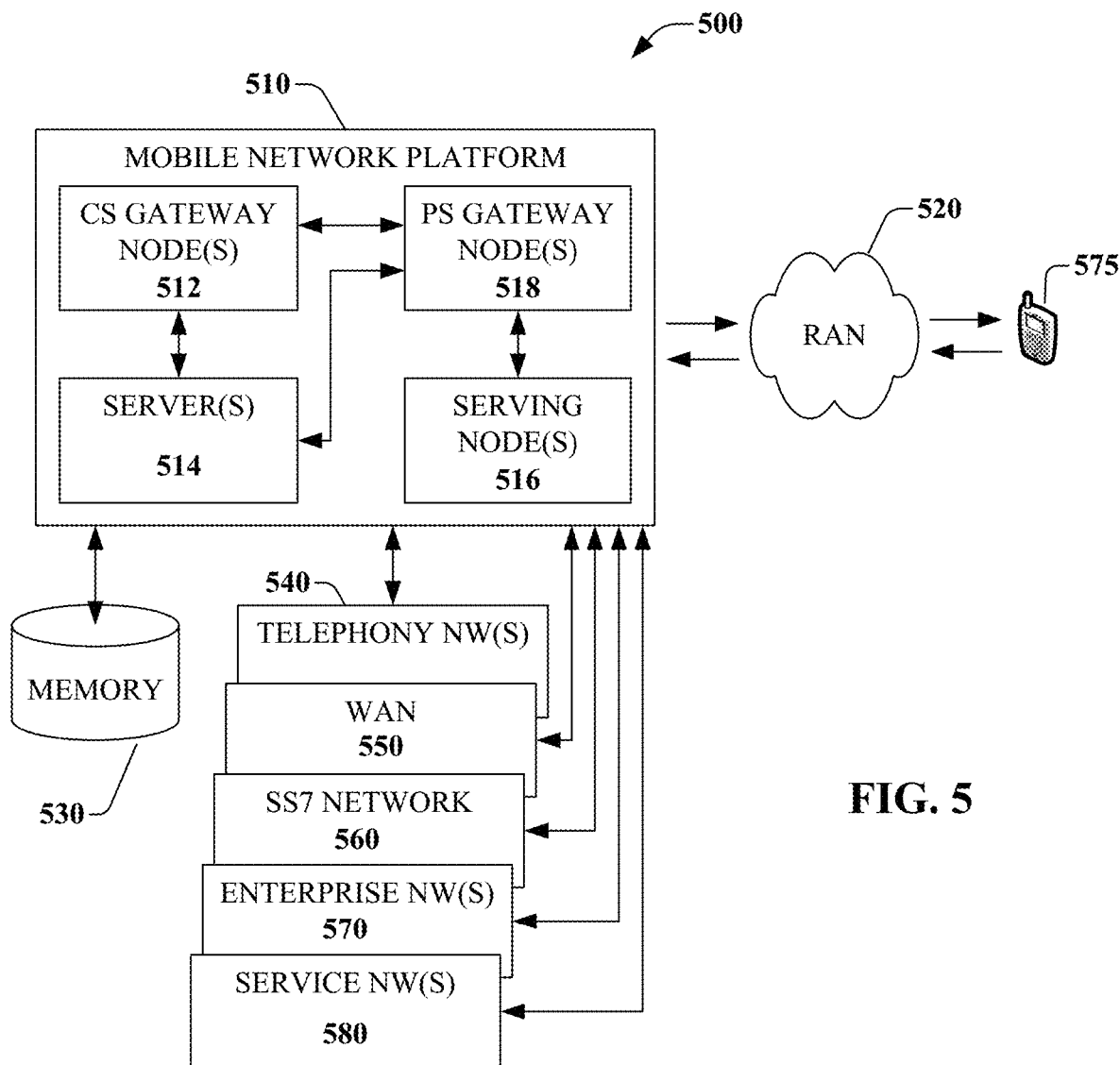
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part determine whether the root cause of a user-reported service issue in a communication network is from the network side or the device side through deep neural networks. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
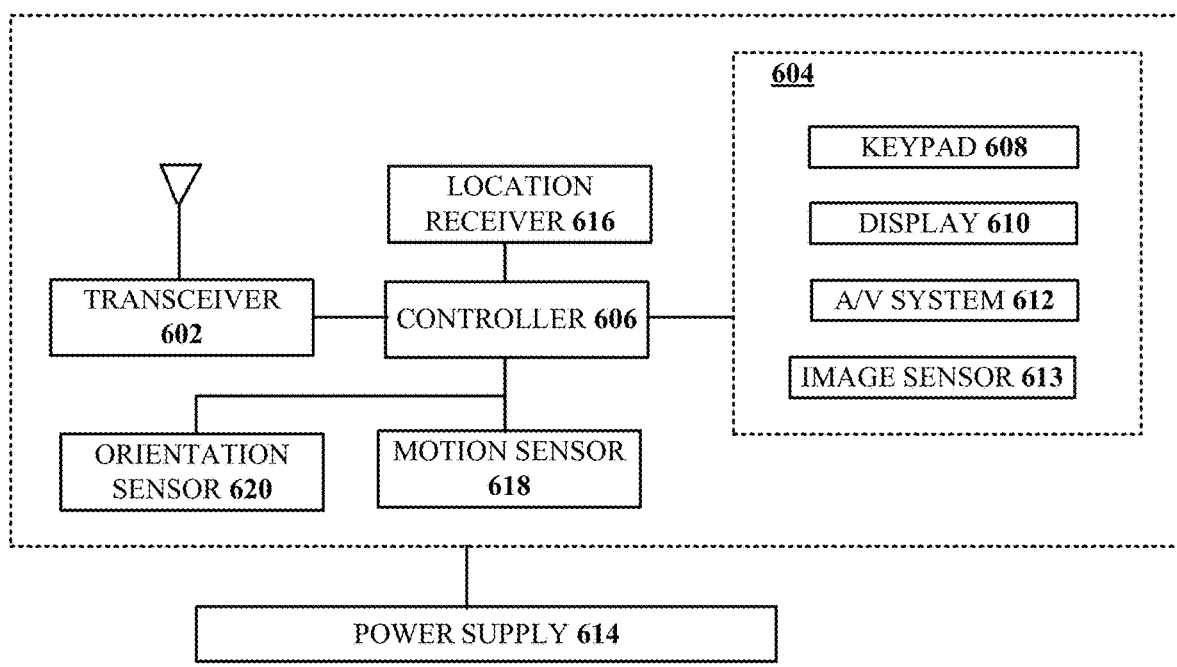
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part determine whether the root cause of a user-reported service issue in a communication network is from the network side or the device side through deep neural networks.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$=confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving, from a customer, information about a service degradation at a user equipment (UE) device of the customer in a cellular network;
receiving, from a cell-level network-state prediction model, a prediction about likelihood of network issues that impact customers in cell sites of the cellular network;
receiving information about current usage of the UE device;
identifying a source of the service degradation, wherein the identifying is based on the prediction about likelihood of network issues and the current usage of the UE device; and
modifying one of a network component of the cellular network and the UE device, based on the identifying the source of the service degradation to correct the service degradation.

2. The device of claim 1, wherein the identifying a source of the service degradation comprises:
determining whether the service degradation is caused by a network-related issue; or
determining whether the service degradation is caused by a UE device-related issue.

3. The device of claim 1, wherein the operations further comprise:
retrieving log data for a plurality of cell sites of the cellular network; and
training the cell-level network-state prediction model using the log data for the plurality of cell sites of the cellular network.

4. The device of claim 3, wherein the training the cell-level network-state prediction model comprises:
training the cell-level network-state prediction model using historical usage data for the plurality of cell sites of the cellular network, user mobility data, performance metrics for one or more cell sites of the plurality of cell sites, and customer care contact data and trouble ticket data for previous reports of service degradation.

5. The device of claim 3, wherein the training a cell-level machine learning model comprises:
retrieving historical record logs for the UE device;
obtaining information identifying a set of reference cell sites of the cellular network frequently accessed by the customer;
aggregating information about customer contacts, wherein each customer contact includes a report about a historical service degradation at a reference cell site of the set of reference cell sites;
aggregating information about historical service degradations determined to be caused by a network-related issue, forming partial ground truth data;
associating the information about customer contacts with the partial ground truth data, forming transferred learning ground truth data; and
pre-training the cell-level machine learning model with the transferred learning ground truth data.

6. The device of claim 1, wherein the receiving information about current usage of the UE device comprises:
retrieving data session logs for a data session of the UE device, including retrieving information about a timestamp of the data session, a time duration of the data session, cell sites of the cellular network contacted by the UE device during the data session and a session status for the data session.

7. The device of claim 1, wherein the operations further comprise:
correlating, in a user equipment-level troubleshooting inference model, UE-level service degradation information with cell sites including a currently-connected cell site with information about network-related issues for a set of references cell sites including the currently-connected cell site for a predetermined period of time.

8. The device of claim 7, wherein the operations further comprise:
applying a sliding window to the information about network-related issues for the predetermined period of time, forming cell-level profile features;
retrieving historical record logs for the UE device;
forming, from the historical record logs for the UE device, UE-level feature profiles for the predetermine period of time; and
correlating the cell-level profile features and the UE-level feature profiles, forming a machine learning model.

9. The device of claim 8, wherein the operations further comprise:
retrieving manual resolution information about past service degradation occurrences from historical troubleshooting log data; and
training the machine learning model as a binary classifier with the manual resolution information, wherein a learning target for the machine learning model comprises a conclusion that the service degradation is caused by a network-related issue or that the service degradation is caused by a device-related issue of the UE device.

10. The device of claim 8, wherein the retrieving the historical record logs for the UE device comprises:
retrieving data session information for a data session between the UE device and a particular cell site of the cellular network, wherein the data session information includes one or more of timestamp information for the data session, a time duration of the data session, identification information for the particular cell site, and a session status for the data session.

11. A non-transitory machine-readable medium, comprising executable instructions that, when executed by a processing system including a processor, facilitate performance of operations, the operations comprising:
training a cell-level machine learning model to predict a likelihood of a cell site in a cellular network having service issues that impact customers of the cellular network;
training a user equipment (UE) level machine learning model using output information from the cell-level machine learning model and historical information about UE-level performance metrics;

receiving, from a customer associated with a UE device operating on the cellular network, information about a service degradation experienced by the customer on the UE device;

providing the information about the service degradation to the UE-level machine learning model; and receiving, from the UE-level machine learning model, information identifying a source of the service degradation.

12. The non-transitory machine-readable medium of claim 11, wherein the operations further comprise:

pre-training the cell-level machine learning model with an alternative learning target, wherein the alternative learning target for the pre-training the cell-level machine learning model comprises a likelihood that one cell site of a selected set of reference cell sites experiences service issues that impact customers of the cellular network.

13. The non-transitory machine-readable medium of claim 11, wherein the training a cell-level machine learning model comprise:

training the cell-level machine learning model with key performance indicator values for a set of reference cell sites, wherein the set of reference cell sites comprises a selected cell site and a plurality of adjacent cell sites located in proximity to the selected cell site.

14. The non-transitory machine-readable medium of claim 13, wherein the operations further comprise:

creating, for each respective reference cell site of the set of reference cell sites, a respective cell-level profile, wherein the creating the respective cell-level profile is based on learned features of the cell-level machine learning model, forming a set of cell-level profiles;

determining, for the UE device, UE-level features associated with interactions by the UE device with reference cell sites of the set of reference cell sites; and training the UE-level model as a binary classifier using the set of cell-level profiles and the UE-level features.

15. The non-transitory machine-readable medium of claim 11, wherein the receiving the information identifying a source of the service degradation comprises:

receiving information identifying the source of the service degradation as a network-related issue; or receiving information identifying the source of the service degradation as a UE device-related issue.

16. A method, comprising:

receiving, by a processing system including a processor, cell-level training data including historical usage data for a plurality of cell sites of a cellular network, user mobility data for user equipment (UE) devices of the cellular network, performance metrics for one or more cell sites of the plurality of cell sites, and customer care contact data and trouble ticket data for previous reports of service degradation by customers in the cellular network;

training, by the processing system, a cell-level network-state prediction model using the cell-level training data;

receiving, by the processing system from a customer, information about a service degradation at a user equipment (UE) device of the customer in the cellular network;

retrieving, by the processing system, UE-level training data including performance metrics, data session logs for a data session by the UE device;

training, by the processing system, a UE-level troubleshooting inference model using the UE-level training data and output information of the cell-level network state prediction model;

providing, by the processing system, to the UE-level troubleshooting inference model the information about the service degradation at the UE device of the customer; and determining, by the processing system, a likely source of the service degradation.

17. The method of claim 16, wherein the determining a likely source of the service degradation comprises:

determining, by the processing system, whether the service degradation is caused by a network-related issue; or determining, by the processing system, whether the service degradation is caused by a UE device-related issue.

18. The method of claim 16, comprising:

retrieving, by the processing system, historical record logs for the UE device;

aggregating, by the processing system, information about customer contacts, wherein each customer contact includes a report about a historical service degradation at a reference cell site of a set of reference cell sites, wherein the reference cell sites comprise cell sites frequently accessed by the UE device;

aggregating, by the processing system, information about historical service degradations determined to be caused by network-related issues, forming partial ground truth data;

associating, by the processing system, the information about customer contacts with the partial ground truth data, forming transferred learning ground truth data; and pre-training, by the processing system, the cell-level network-state prediction model with the transferred learning ground truth data.

19. The method of claim 16, comprising:

pre-training, by the processing system, the cell-level network-state prediction model with an alternative learning target, wherein the alternative learning target comprises a likelihood that one cell site of a selected set of reference cell sites experiences service issues that impact customers of the cellular network.

20. The method of claim 16, comprising:

initiating, by the processing system, a modification of a network component of the cellular network or the UE device, wherein the initiating a modification is based on the determining, by the processing system, a likely source of the service degradation to correct the service degradation.

* * * * *